United States Patent [19]

Emelko

[11] Patent Number: 6,122,010
[45] Date of Patent: *Sep. 19, 2000

[54] TELEVISION SIGNAL DATA TRANSMISSION SYSTEM

[75] Inventor: Glenn A. Emelko, Willoughby, Ohio

[73] Assignee: Vidicast Ltd., Mentor, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/898,314

[22] Filed: Jul. 22, 1997

Related U.S. Application Data

[63] Continuation-in-part of application No. 08/767,371, Dec. 16, 1996.

[51] Int. Cl.[7] .................................................. H04N 7/08
[52] U.S. Cl. ........................... 348/461; 348/465; 348/473; 375/295; 341/56
[58] Field of Search .................................. 348/461, 463, 348/465, 467, 473, 723, 17, 21; 375/295, 340, 341; 341/56, 57; H04N 7/08

[56] References Cited

U.S. PATENT DOCUMENTS

| | | | |
|---|---|---|---|
| 3,634,855 | 1/1972 | Miller | 340/347 |
| 3,743,767 | 7/1973 | Bitzer et al. | 348/463 |
| 3,927,250 | 12/1975 | Rainger | 348/467 |
| 3,984,624 | 10/1976 | Waggener | 348/473 |
| 4,183,054 | 1/1980 | Patisaul et al. | 348/6 |
| 4,367,488 | 1/1983 | Leventer et al. | 348/467 |
| 4,484,328 | 11/1984 | Schlafly | 370/294 |
| 4,538,174 | 8/1985 | Gargini et al. | 348/7 |
| 4,556,973 | 12/1985 | Uemura | 370/490 |
| 4,626,913 | 12/1986 | Gurumurthy | 348/464 |
| 4,665,431 | 5/1987 | Cooper | 348/480 |
| 4,750,036 | 6/1988 | Martinez | 348/12 |
| 4,789,895 | 12/1988 | Mustafa et al. | 348/464 |
| 4,800,428 | 1/1989 | Johanndeiter et al. | 348/468 |
| 4,805,020 | 2/1989 | Greenberg | 348/460 |
| 4,807,031 | 2/1989 | Broughton et al. | 348/460 |
| 4,910,750 | 3/1990 | Fisher | 375/19 |
| 4,920,503 | 4/1990 | Cook | 348/552 |
| 4,958,230 | 9/1990 | Jonnalagadda et al. | 348/21 |
| 4,969,041 | 11/1990 | O'Grady et al. | 348/473 |
| 5,014,125 | 5/1991 | Pocock et al. | 348/7 |
| 5,063,446 | 11/1991 | Gibson | 348/484 |
| 5,075,773 | 12/1991 | Pullen et al. | 348/432 |
| 5,177,604 | 1/1993 | Martinez | 348/13 |
| 5,191,330 | 3/1993 | Fisher et al. | 341/56 |
| 5,200,822 | 4/1993 | Bronfin et al. | 348/460 |
| 5,243,423 | 9/1993 | DeJean et al. | 348/473 |
| 5,251,301 | 10/1993 | Cook | 395/200.76 |
| 5,327,237 | 7/1994 | Gerdes et al. | 348/476 |
| 5,387,941 | 2/1995 | Montgomery et al. | 348/473 |
| 5,410,360 | 4/1995 | Montgomery | 348/473 |
| 5,452,009 | 9/1995 | Citta | 348/470 |
| 5,629,958 | 5/1997 | Willming | 375/295 |
| 5,686,966 | 11/1997 | De La Cierva, Sr. | 348/461 |
| 5,767,896 | 6/1998 | Nemirofsky | 348/13 |
| 5,903,231 | 5/1999 | Emelko | 341/56 |

FOREIGN PATENT DOCUMENTS

| | | | |
|---|---|---|---|
| 0 490 504 A2 | 6/1992 | European Pat. Off. | H04L 25/49 |
| WO 96/26607 | 8/1996 | European Pat. Off. | H04N 7/03 |
| 7310645 | 2/1975 | Netherlands | H04L 25/48 |
| WO 94/09578 | 4/1994 | Sweden | H04L 7/027 |
| PCT/IT96/00032 | 8/1996 | WIPO | H04N 7/03 |

OTHER PUBLICATIONS

Harlow W. Neu, Some Techniques of Pulse Code Modulation, *Bulletin Schweizerischen Elektrotechnischen Vereins*, vol. 51, No. 20, Oct. 8, 1960, pp. 978–985.

*Primary Examiner*—John K. Peng
*Assistant Examiner*—Jean W. Désir
*Attorney, Agent, or Firm*—Arter & Hadden LLP

[57] ABSTRACT

A system for high-speed data transmission using a television signal to communicate encoded data. A multi-level encoding method is employed whereby raw data values are converted into one of a plurality of voltage levels. The encoding method allows for improved data transfer rates, conservation of bandwidth, and self-synchronization for decoding. Mock timing data signals are generated to comply with television signal standards, such as NTSC, SECAM, PAL and HDTV.

53 Claims, 20 Drawing Sheets

TABLE 1

| ENCODER STATE | ENCODED OUTPUT INFORMATION | MSB DIGITAL ENCODED DATA (DP7DP6DP5) | DIGITAL ENCODED DATA (DP7DP6DP5DP4DP3DP2DP1DP0) | IRE LEVEL | DISPLAY LEVEL |
|---|---|---|---|---|---|
| STATE 7 | LEVEL E | 7(111) | 224 (11100000) | 100 | WHITE |
| STATE 6 | LEVEL D | 6(110) | 192 (11000000) | 80 | 80 WHITE |
| STATE 5 | LEVEL C | 5(101) | 160 (10100000) | 60 | 60 WHITE |
| STATE 4 | LEVEL B | 4(100) | 128 (10000000) | 40 | 40 WHITE |
| STATE 3 | LEVEL A/IDLE | 3(011) | 96 (01100000) | 20 | 20 WHITE |
| STATE 2 | HORZ./VERT. BLANK | 2(010) | 64 (01000000) | 0 | BLACK |
| STATE 2 | HORZ./VERT. SYCH. AND EQUALIZATION | 0(000) | 0 (00000000) | -40 | BLACKER THAN BLACK |

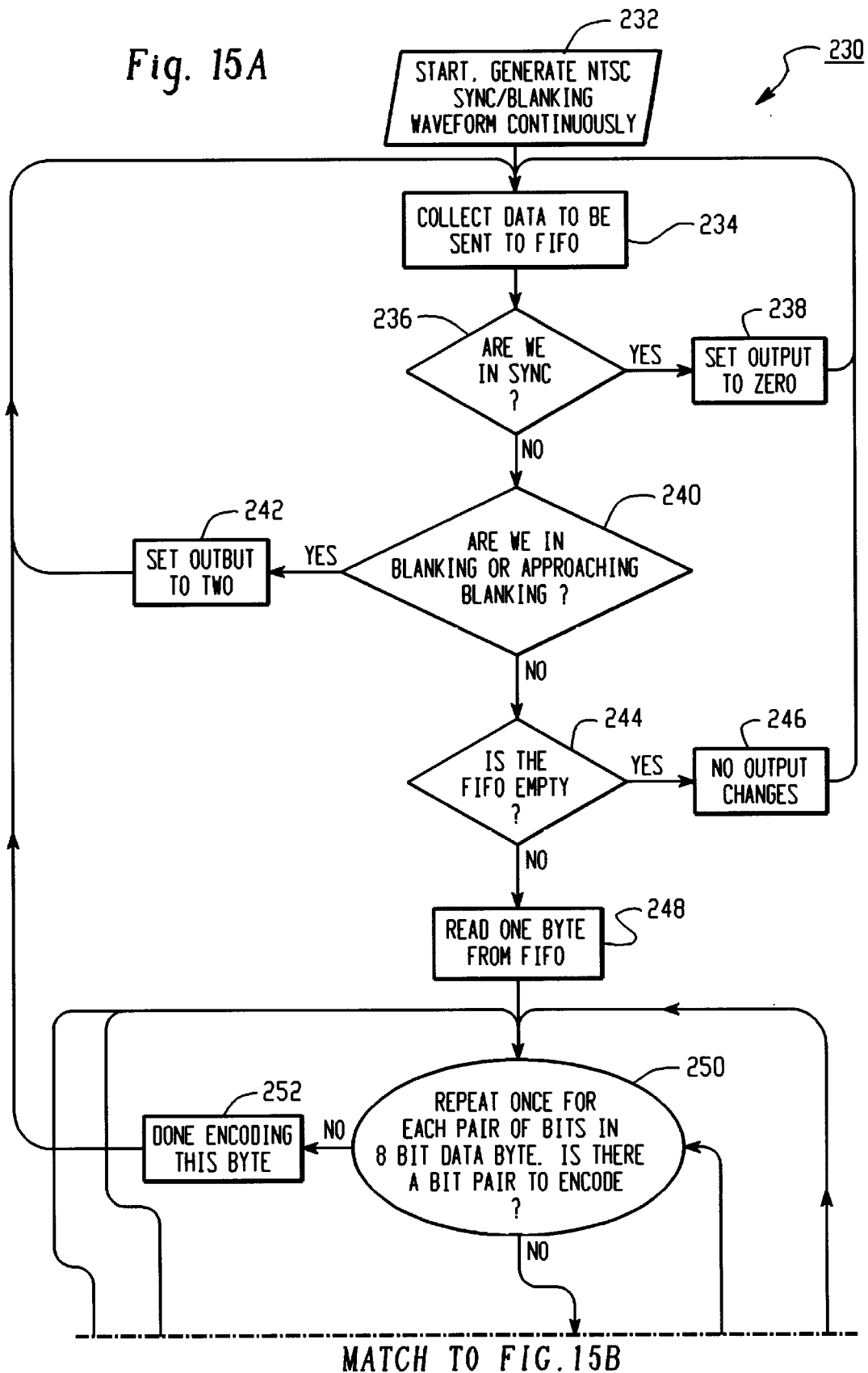

TABLE 2:

| ORIGINAL DIGITAL ENCODED DATA | ENCODED INPUT INFORMATION | ENCODER STATE | DIFITAL ENCODED INPUT DATA RANGE | INPUT PATTERN (IN [2..0]) |
|---|---|---|---|---|
| 224 | LEVEL E | STATE 7 | ⩾218 AND <255 | 4 (100) |
| 192 | LEVEL D | STATE 6 | ⩾184 AND <218 | 3 (011) |
| 160 | LEVEL C | STATE 5 | ⩾150 AND <184 | 2 (010) |
| 128 | LEVEL B | STATE 4 | >116 AND <150 | 1 (001) |
| 96 | LEVEL A/IDLE | STATE 3 | <116 | 0 (000) |
| 64 | BLANKING | STATE 2 | | |
| 0 | SYNCH/WQ. | STATE 2 | | |

Fig. 17

TABLE 3:

| ind2 | ind1 | ind0 | res1 | res0 | in2 | in1 | in0 | *res1 | *res0 | strobe |
|---|---|---|---|---|---|---|---|---|---|---|
| 0 | 0 | 0 | 0 | 1 | 0 | 0 | 0 | 0 | 0 | 1 [NO] |
| 0 | 0 | 1 | 0 | 1 | 0 | 0 | 0 | 0 | 0 | 0 |
| 0 | 0 | 0 | 0 | 1 | 0 | 0 | 1 | 0 | 0 | 0 |
| 0 | 0 | 1 | 0 | 1 | 0 | 0 | 1 | 0 | 0 | 1 [NO] |
| 0 | 0 | 0 | 0 | 1 | 0 | 1 | 0 | 0 | 1 | 0 |
| 0 | 0 | 1 | 0 | 1 | 0 | 1 | 0 | 0 | 1 | 0 |
| 0 | 0 | 0 | 0 | 1 | 0 | 1 | 1 | 1 | 0 | 0 |
| 0 | 0 | 1 | 0 | 1 | 0 | 1 | 1 | 1 | 0 | 0 |
| 0 | 0 | 0 | 0 | 1 | 1 | 0 | 0 | 1 | 1 | 0 |
| 0 | 0 | 1 | 0 | 1 | 1 | 0 | 0 | 1 | 1 | 0 |
| 0 | 0 | 0 | 0 | 0 | 0 | 0 | 0 | 0 | 0 | 0 |
| 0 | 1 | 1 | 0 | 0 | 0 | 0 | 0 | 0 | 0 | 0 |
| 0 | 0 | 1 | 0 | 0 | 0 | 0 | 1 | 0 | 1 | 1 [NO] |
| 0 | 1 | 0 | 0 | 0 | 0 | 0 | 1 | 0 | 1 | 0 |
| 0 | 0 | 1 | 0 | 0 | 0 | 1 | 0 | 0 | 1 | 0 |
| 0 | 1 | 0 | 0 | 0 | 0 | 1 | 0 | 0 | 1 | 1 [NO] |
| 0 | 0 | 1 | 0 | 0 | 0 | 1 | 1 | 1 | 0 | 0 |
| 0 | 1 | 0 | 0 | 0 | 0 | 1 | 1 | 1 | 0 | 0 |
| 0 | 0 | 1 | 0 | 0 | 1 | 0 | 0 | 1 | 1 | 0 |
| 0 | 1 | 0 | 0 | 0 | 1 | 0 | 0 | 1 | 1 | 0 |
| 0 | 1 | 0 | 1 | 0 | 0 | 0 | 0 | 0 | 0 | 0 |
| 0 | 1 | 1 | 1 | 0 | 0 | 0 | 0 | 0 | 0 | 0 |
| 0 | 1 | 0 | 1 | 0 | 0 | 0 | 1 | 0 | 1 | 0 |
| 0 | 1 | 1 | 1 | 0 | 0 | 0 | 1 | 0 | 1 | 0 |
| 0 | 1 | 0 | 1 | 0 | 0 | 1 | 0 | 1 | 0 | 1 [NO] |
| 0 | 1 | 1 | 1 | 0 | 0 | 1 | 0 | 1 | 0 | 0 |
| 0 | 1 | 0 | 1 | 0 | 0 | 1 | 1 | 1 | 0 | 0 |
| 0 | 1 | 1 | 1 | 0 | 0 | 1 | 1 | 1 | 0 | 1 [NO] |
| 0 | 1 | 0 | 1 | 0 | 1 | 0 | 0 | 1 | 1 | 0 |
| 0 | 1 | 1 | 1 | 0 | 1 | 0 | 0 | 1 | 1 | 0 |
| 0 | 1 | 1 | 1 | 1 | 0 | 0 | 0 | 0 | 0 | 0 |
| 1 | 0 | 0 | 1 | 1 | 0 | 0 | 0 | 0 | 0 | 0 |
| 0 | 1 | 1 | 1 | 1 | 0 | 0 | 1 | 0 | 1 | 0 |
| 1 | 0 | 0 | 1 | 1 | 0 | 0 | 1 | 0 | 1 | 0 |
| 0 | 1 | 1 | 1 | 1 | 0 | 1 | 0 | 1 | 0 | 0 |
| 1 | 0 | 0 | 1 | 1 | 0 | 1 | 0 | 1 | 0 | 0 |
| 0 | 1 | 1 | 1 | 1 | 0 | 1 | 1 | 1 | 1 | 1 [NO] |
| 1 | 0 | 0 | 1 | 1 | 0 | 1 | 1 | 1 | 1 | 0 |
| 0 | 1 | 1 | 1 | 1 | 1 | 0 | 0 | 1 | 1 | 0 |
| 1 | 0 | 0 | 1 | 1 | 1 | 0 | 0 | 1 | 1 | 1 [NO] |

Fig. 18

TELEVISION SIGNAL DATA TRANSMISSION SYSTEM

RELATED APPLICATIONS

The present application is a continuation-in-part (CIP) of co-pending U.S. application Ser. No.08/767,371 filed Dec. 16, 1996.

FIELD OF THE INVENTION

The present invention relates to the field of high-speed data transmission, and more particularly, to a system for providing high-speed data transmission using a television signal.

BACKGROUND OF THE INVENTION

There has been a failure in the field of data transmission systems to recognize the potential of a television signal, and in particular, the large bandwidth available using a television signal. At present, methods of encoding data into a television signal have been restricted to relatively low bandwidth and inefficient use of the television signal medium. The reason for this appears to be that the data encoding methods in use were designed more than twenty-five years ago, and the bandwidth required for the original purpose is relatively low. For instance, these methods were designed to allow a television signal to carry closed-captioning and/or teletext information. The data rate needed for carrying this information is extremely low, and though the bit rate of the data transmission was fairly high (e.g., 4.5 million bits per second in bursts), the overall bandwidth utilization of the television signal generally does not exceed 45,000 bits per second, Moreover, the data encoding methods used for captioning and teletext are fairly rudimentary. In this regard, these methods divide a signal line of a television picture up into a number of time slices, and then impress digital information into the slots as a series of black or white spots, representing the digital values of zero and one. The data bytes are encoded into changing voltages (i.e., black and white spots), and decoded back into bytes by using a commonly available electronic device, such as UART (Universal Asynchronous Receiver Transmitter) or an ACIA (Asynchronous Communications Interface Adapter). One limitation of this "binary coding" scheme is that it limits the data transmission rate. In order to achieve greater transmission rates, data has been encoded into complex waveforms, such as tones, which are then phase, frequency, and amplitude modulated in order to carry the information. For instance, this method is used in data modems for use in longer distance high-speed communications. Other forms of encoding for high-speed data transmission include RF (Radio Frequency) modulation, networks such as Ethernet or Arcnet, QAM (Quadrature Amplitude Modulation), ASK (Amplitude Shift Keying), PSK (Phase Shift Keying), FSK (Frequency Shift Keying), TCM (Trellis Coded Modulation) and QPSK (Quadrature Phase Shift Keying). All of the foregoing methods encode data on to waveforms for transmission, which is the next step beyond raw digital data.

In order to derive further benefits from the use of the television signal as a transmission medium, it would be advantageous to encode multiple data bits in parallel as discreet levels into the television image.

The "information highway" of the future relies on high-speed data transmission to distribute image, sound and video to multiple access points worldwide. Currently, the distribution bottleneck is the data rate (defined in bits per second) capabilities of the communications medium in use. For example, one minute of compressed digital video data may be represented by approximately ten megabytes of data. Currently available communications mediums include voice grade modems, leased line modems, ISDN services, fiber-optic or high-speed land-line links, radio modems and satellite data links.

Prior art approaches to achieving higher data transmission rates have typically involved trying to compress the data or to pack more bits per basic transmission unit (baud) within the same channel bandwidth. For example, a 9.6 Kbps modem for use on standard two-wire telephone lines operates within the 3 Khz bandwidth available. To reach 9.6 Kbps, it may use a basic baud rate of 2400 baud, and encode 4 bits per baud. The "baud" defines a number of transitions made on the base carrier each second, and the number of bits per baud multiplied by the baud rate provides a number of bits per second (bps).

Another aspect of the present invention is directed to the encoding of digital data. Prior art data encoding methods for encoding digital information have used two voltage levels, where each voltage level represents a single bit. In this respect, a first voltage level represents a digital value "0," while a second voltage level represents a digital value "1." As a result, a set of eight of these voltage levels is needed to encode one byte of digital data. Data bytes are encoded into changing voltages and decoded back into bytes. This is typically done by using a UART or an ACIA. UARTs convert parallel data (usually eight-bit words) to a serial data stream for transmission over a single wire cable and likewise convert a received serial bit stream to parallel words. The serial data stream is comprised of a signal having two voltage levels, one representing a digital "0," the other representing a digital "1."

In many cases, the data rate achievable by UARTs and ACIAs is insufficient for the desired application. In order to achieve greater data rates for high-speed communications, data has been encoded into complex waveforms such as tones, which are then phase, frequency and amplitude modulated. As mentioned above, data has been encoded using RF, QAM, ASK, PSK, FSK, TCM and QPSK. All of the foregoing methods encode data into AC waveforms for transmission.

The present invention provides a novel system for transmitting and receiving digital data using a conventional television signal for data transfer. In a preferred embodiment of the present invention an encoding system is used which overcomes the data transfer rate limitations of the prior art encoding systems, and provides a system for encoding multiple data bits in parallel as transitions between discrete levels.

SUMMARY OF THE INVENTION

In accordance with a preferred embodiment of the present invention, there is provided a television signal data transmission system having a transmitter for encoding digital data and a mock television signal, and a receiver for decoding the encoded digital data and the mock television signal.

It is an object of the present invention to provide a data transmission system which uses a conventional television signal to transmit encoded digital data at very high data transmission rates.

It is another object of the present invention to provide a data transmission system which encodes mock television signals to comply with government standards for regular broadcast television signals.

It is another object of the present invention to provide a data transmission system which uses a multi-level encoding system to further increase the data transmission rate.

It is another object of the present invention to provide a data transmission system which uses a television signal as a high-speed data transmission medium.

It is still another object of the present invention to provide a data transmission system which uses the active video portion of the television signal to transmit data.

It is still another object of the present invention to provide a data transmission system which significantly reduces the data transmission time and cost.

It is yet another object of the present invention to provide a data transmission system which uses standard, readily available television transmission and receiving devices.

It is yet another object of the present invention to provide a data transmission system which provides greater bandwidth at lower cost.

These and other objects will become apparent from the following description of a preferred embodiment taken together with the accompanying drawings and appended claims.

BRIEF DESCRIPTION OF THE DRAWINGS

The above-mentioned and other features and objects of the invention and the manner of attaining them will become more apparent and the invention will be best understood by reference to the following description of an embodiment of the invention taken in conjunction with the accompanying drawings and appended claims, wherein:

FIGS. 15A and 15B provide a diagram illustrating the control unit logic for encoding data;

FIG. 17 is a table showing the outputs of the decoder state machine and corresponding inputs;

FIG. 18 is a table showing the outputs for various signal generated by the control unit logic for decoding data.

DETAILED DESCRIPTION OF THE PREFERRED EMBODIMENT

Figure 1:
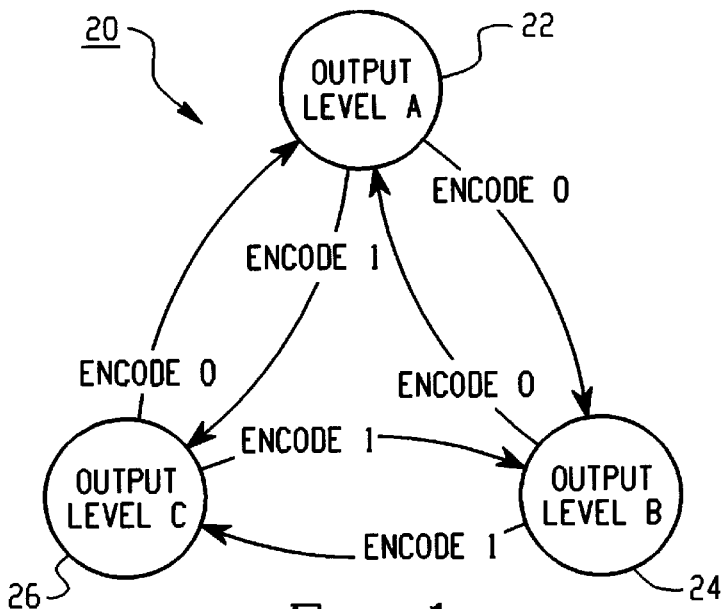
FIG. 1 is a state diagram for encoding two different input values into three output levels, according to a preferred embodiment of the present invention.

In a preferred embodiment of the present invention, a novel system for encoding N input values into at least N+1 output levels is used. This novel encoding system is described in detail below. However, it should be appreciated that other suitable encoding systems may be used with the present invention to yield similar results In a preferred embodiment of the novel encoding system each output level is represented by a different voltage. However, each output level may also be represented by a different frequency, phase, or amplitude. Referring now to the drawings wherein the showings are for the purpose of illustrating a preferred embodiment of the invention only, and not for the purpose of limiting same, FIG. 1 shows a state diagram 20 illustrating the transition between states for encoding two different input values (i.e., "0" and "1") into three output levels (i.e., output levels A, B and C), according to a preferred embodiment of the present invention. For instance, beginning at state 22 (output level A), if the next input value is a "0," the system transitions to state 24 (output level B). In contrast, if the next input value is a "1," the system transitions to state 26 (output level C). The system will transition from one state to one of the other two remaining states as each consecutive input value is encoded. Importantly, it should be noted that no two consecutive input values will be encoded as the same output level.

Figure 2:
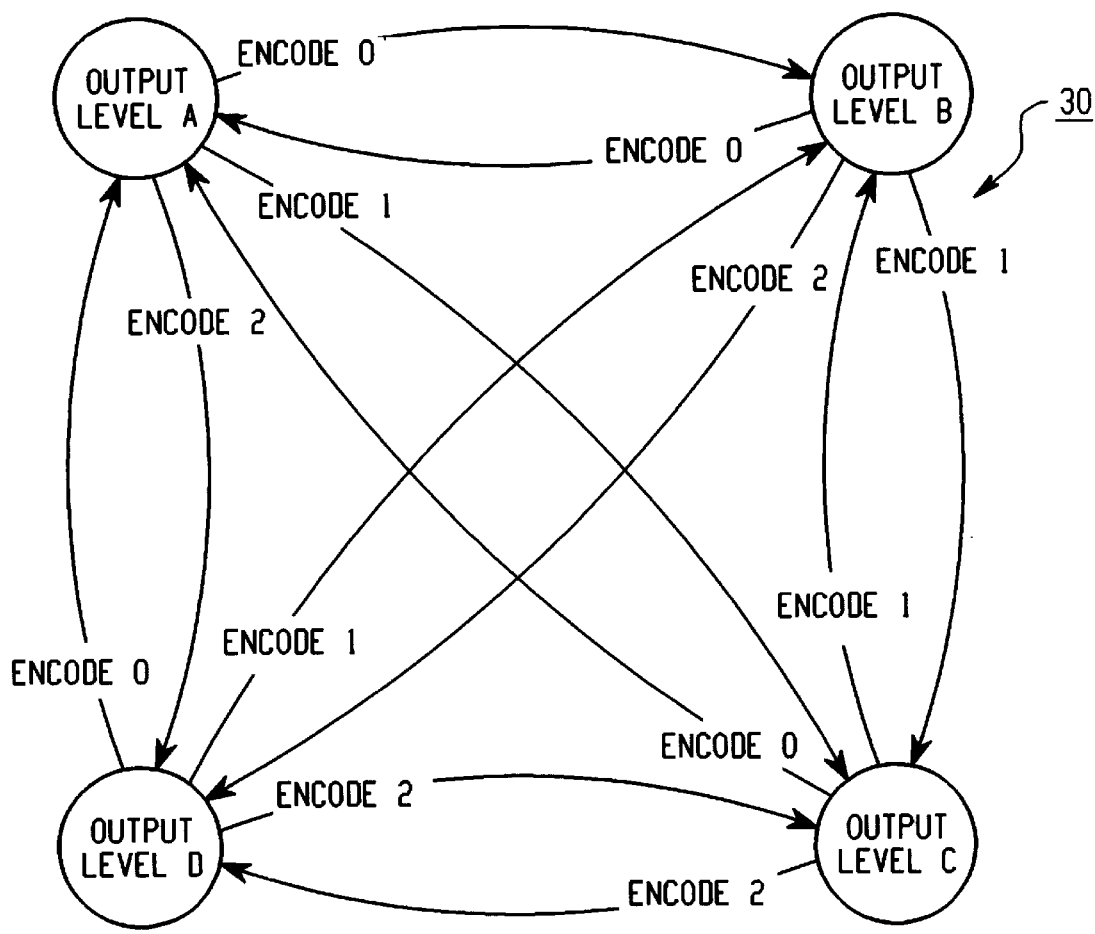
FIG. 2 is a state diagram for encoding three different input values into four output levels, according to a preferred embodiment of the present invention.

FIG. 2 shows a state diagram 30 illustrating the transition between states for encoding three input values (i.e., "0," "1" and "2") into four output levels (i.e., output levels A, B, C and D), according to a preferred embodiment of the present invention.

Figure 3:
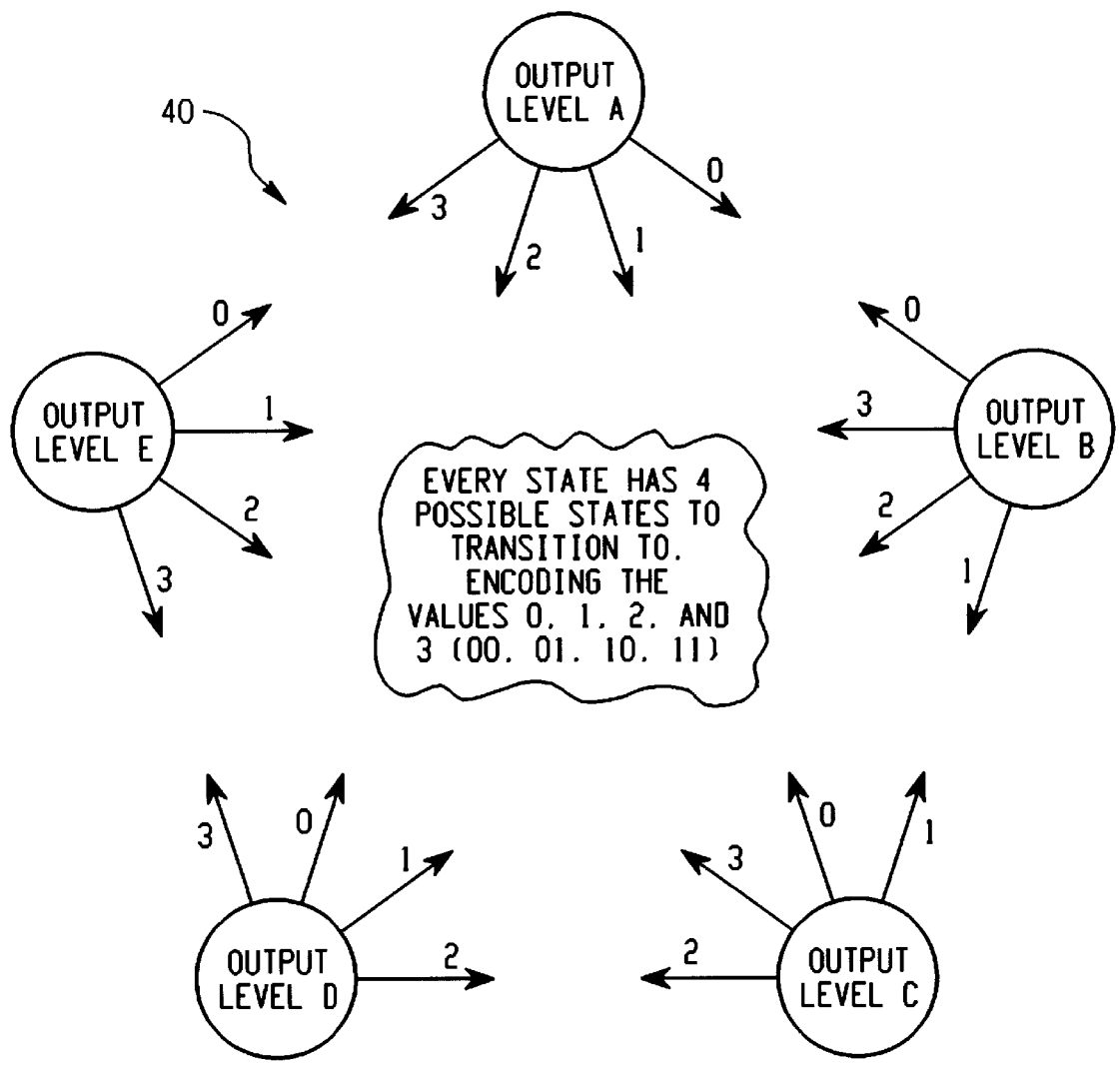
FIG. 3 is a state diagram for encoding four different input values into five output levels, according to a preferred embodiment of the present invention.

FIG. 3 shows a state diagram 40 illustrating the transition is between states for the encoding of four input values (i.e., "0", "1", "2" and "3",' into five output levels (i.e., output levels A, B, C, D and E), according to a preferred embodiment of the present invention. It should be appreciated that since there are four input values, each input value may represent a bit pair (i.e., "00," "01," "10," and "11").

Therefore, each output level will represent two bits, rather than one bit, as in conventional encoding systems. Moreover, where N different input values are encoded into at least N+1 output levels, each input value can represent $\log_2(N)$ bits. As a result of using a single input value to represent a plurality of bits, higher data transfer rates are achievable, and bandwidth can be conserved. It should be appreciated that while in a preferred embodiment of the present invention the input values encode base 2 data (i.e., $\log_2(N)$ bits) the input values may also encode base X data. Therefore, the input values may represent values 0 through X−1 in base X with the encoded output having at least X different output levels. It should also be understood that there may be more than N+1 output levels and transitions thereof for encoding N different input values. This allows for simplified implementation of various error detection and correction methods.

Figure 4:
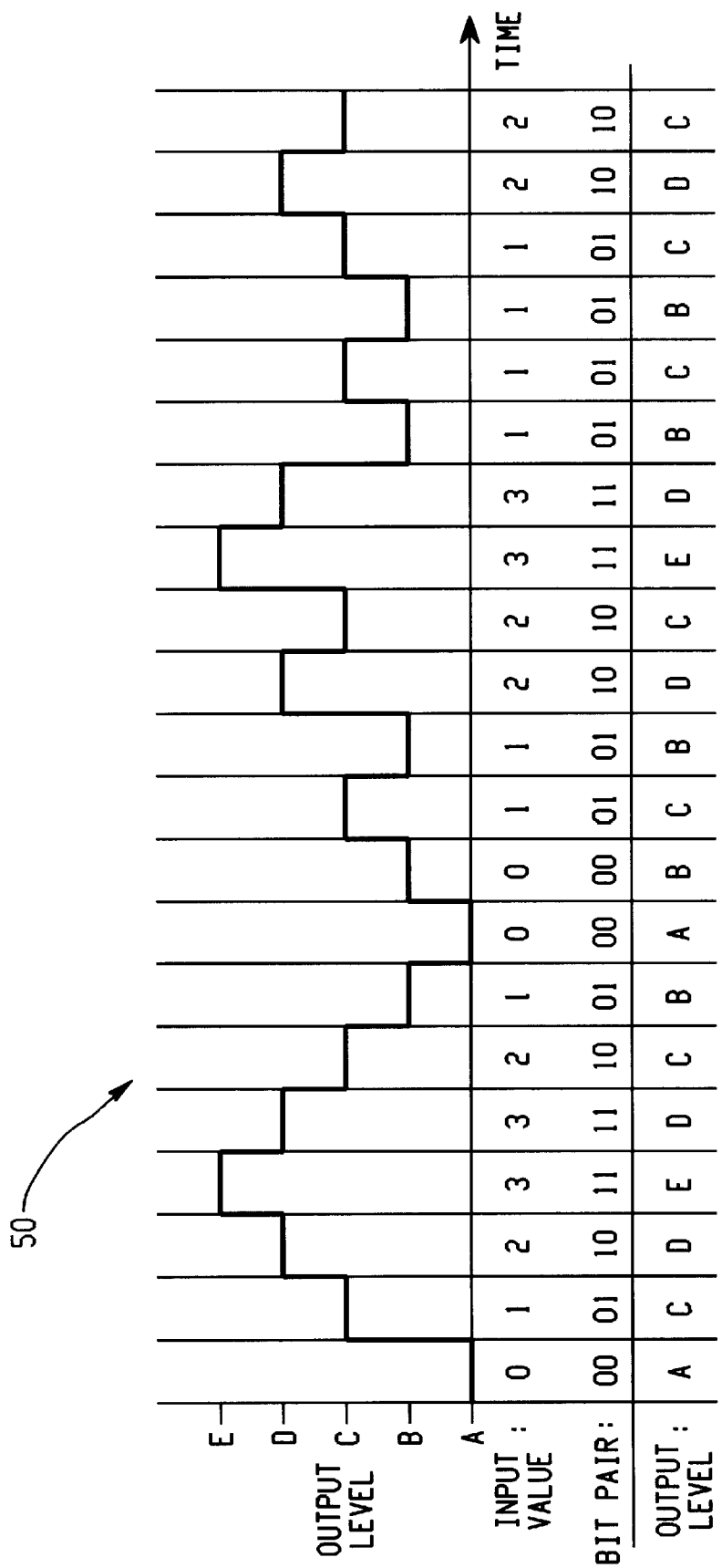
FIG. 4 is a timing diagram illustrating the encoding of four different input values according to the state diagram shown in FIG. 3.

A detailed description of the present invention as applied to the encoding of four input values into five output levels, will now be described with reference to FIGS. 4 and 5. FIG. 4 provides a timing diagram 50 which shows the transition of the output levels as each input value is encoded. It should be appreciated that in the embodiment shown in FIG. 4, each input value represents a bit pair. For the purpose of illustration, input value "0" represents bit pair "01," input value "1" represents bit pair "01," input value "2" represents bit pair "10" and input value "3" represents bit pair "11." As can be seen from FIG. 4, each consecutive output level will be different. Each output level A thru E is a discrete voltage level. For instance, output levels A thru E may correspond to voltages in the range of 0 to 5 volts. The input values shown in FIG. 4 are encoded into output levels A thru E according to the algorithm shown in flow chart 60 of FIG. 5. Beginning with step 62, a FIRST flag is set to TRUE. This will indicate that this is the first input value to be encoded. At step 64, an input value will be read in. Next, at step 66, it is determined whether the input value is the first input value to be encoded, by determining the status of the FIRST flag. If the input value is the first input value to be encoded, a first set of rules (steps 70–76) will be applied. If the input value is not the first input value to be encoded, it will be determined whether a second set of rules (steps 80–86) should be applied, as will be discussed below. For instance, in FIG. 4, the first input value is a "0" (corresponding to bit pair "0"). Accordingly, the conditions exist for applying the first set of rules. In particular, step 70 will be executed. In this respect, the output level will be set to A and the LAST variable will be set to "0." The LAST variable is used as the reference value to determine the appropriate set of rules to be applied following the first input value, as will be described below in connection with step 68.

It should be understood that only one of the steps 70–76 will be valid when applying the first set of rules. Accordingly, step 90 will follow step 70. Step 90 sets the FIRST flag to FALSE for the subsequent input values. The algorithm then returns to step 64 to read in the next input value. In FIG. 4, the next consecutive input value is a "1." Since the FIRST flag is now set to FALSE, the algorithm will proceed from step 66 to step 68. At step 68, it is determined whether the input value is less than the LAST variable. This step determines whether the first set of rules (steps 70–76) should be applied or whether the second set of rules (steps 80–86) should be applied. In the present example, the input value of "1" is greater than the LAST variable, which has been previously set to "0" at step 70. Therefore, the algorithm will apply the second set of rules (steps 80–86). Since the input value is "1," step 82 will be executed. Step 82 sets the output level to C and the LAST variable to 2. The algorithm then proceeds to step 90 and returns again to step 64 for reading in the next consecutive input value. The algorithm will continue in this manner until all of the input values have been encoded as output levels.

With reference to FIG. 4, it should be appreciated that the output level of the preceding encoded input value will determine the output level for the next consecutive encoded input value. In particular, the next consecutive input value will be encoded as one of the four remaining output levels. As a result, when two consecutive input values are the same, such as the consecutive 3's following the first three input values in FIG. 4, each of the 3's will be encoded as different output levels. In the case of the first "3," the output level is E, whereas the second 3 is encoded as output level D. Since no consecutive output level will be the same, the output levels will transition for each consecutive encoded input value.

Figure 6:
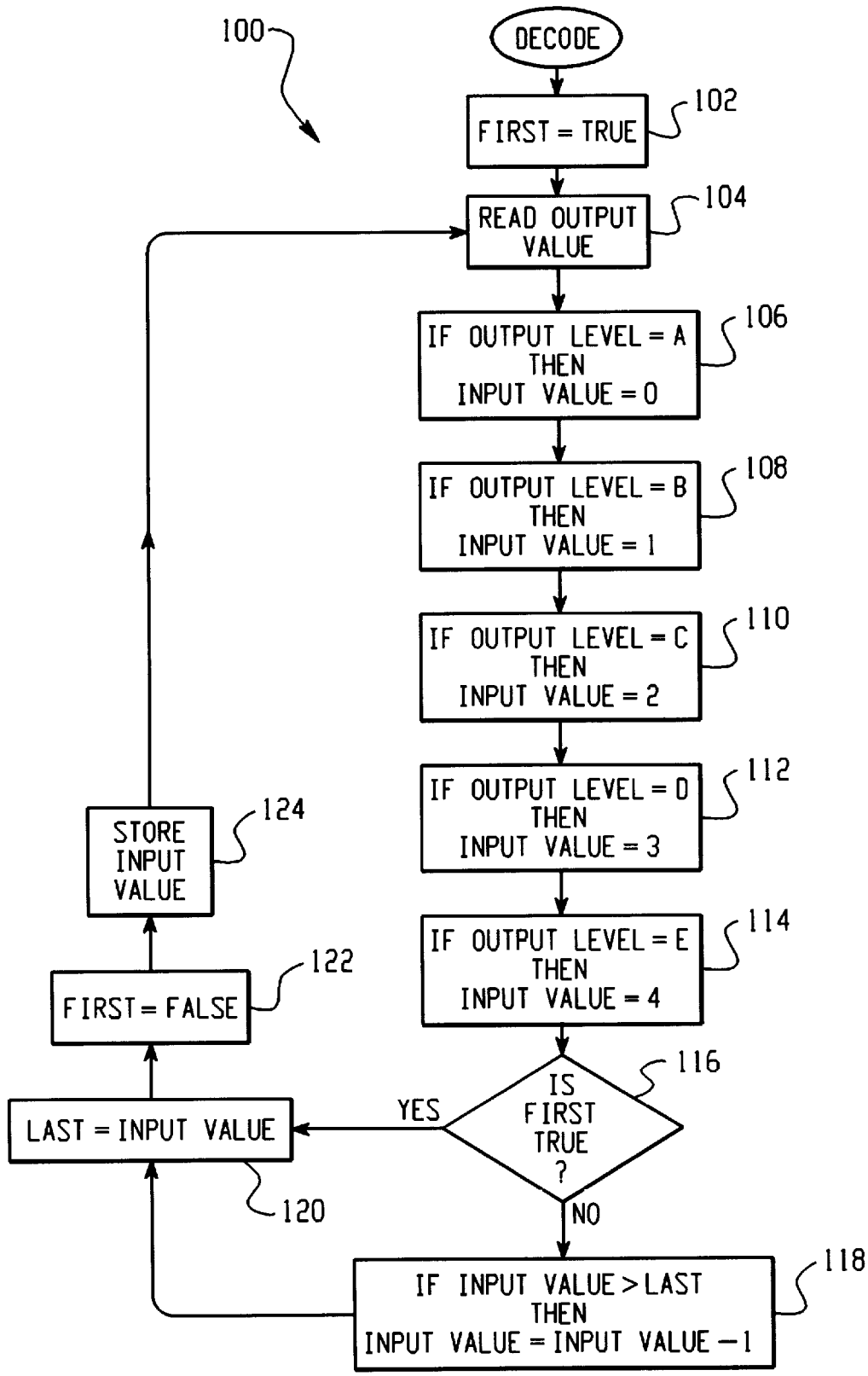
FIG. 6 is a flow chart illustrating a preferred embodiment of the algorithm for decoding output levels into input values.

Referring now to FIG. 6, there is shown a flow chart 100 which illustrates an algorithm for decoding output levels back into input values, according to a preferred embodiment of the present invention. Beginning with step 102, the FIRST flag is set to TRUE indicating that this is the first output level to be decoded. At step 104, the output level is read in. For steps 106–114, an input value is determined based upon the output level read in. However, in some cases this input value will be modified, as will be explained below in connection with step 118. Therefore, the decoded input value will be determined based upon a set of rules determined by both the current output level and one or more prior output levels. If the output level is the first output level read in (i.e., FIRST= TRUE), then the input value is not modified. In this respect, the algorithm will proceed from step 116 to step 120 where the LAST variable will be set the input value 5. It should be appreciated that the LAST variable is used to det if an input value needs to be modified, as will be explained in connection with step 118. Proceeding next to step 122, the FIRST flag is set to FALSE for reading subsequent output levels. At step 124, the input value is stored. The algorithm now returns to step 104, to read in the next consecutive output level. After evaluating the output level at steps 106–114, if the FIRST flag is no longer true (step 116), the algorithm proceeds to step 118. At step 118, it is determined whether the input value (obtained at one of the steps 106–114) is greater than the LAST variable If so, the input value is modified by decrementing it by one. If the input value is not greater than the LAST variable, then the input value is not modified. The algorithm then proceeds to step 120, where the LAST variable is set equal to the present input value, and step 122. At step 124, the input value is stored. The algorithm then returns to step 104 to read in the next consecutive output level. The algorithm will continue in this manner until all of the output levels have been decoded back to the original input values.

As noted above, each consecutive output level in the encoded waveform will be different, and thus necessitate a transition. As a result, the decoding system will not require an external clocking signal to synchronize with the encoded waveform. In this regard, the decoding system is self-synchronizing with the encoded waveform by using the transition of each consecutive output level as the indicator that a new output level has been received for decoding. Thus, the decoder can be easily synchronized with an encoded waveform having a variable transmission speed.

Figure 5:
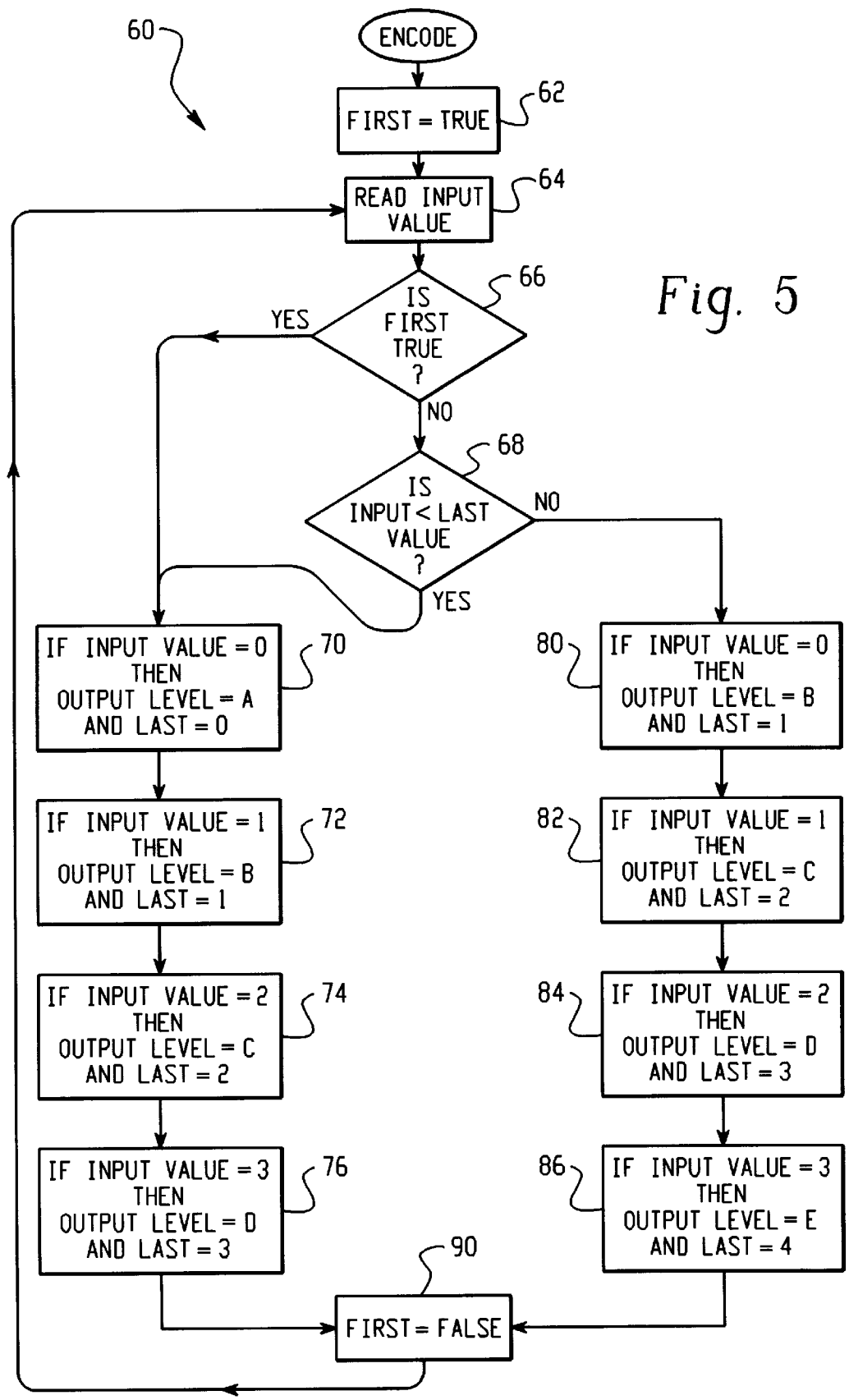
FIG. 5 is a flow chart illustrating a preferred embodiment of the algorithm for encoding the input values according to the state diagram shown in FIG. 3.

It should be understood that while FIGS. 4–6 show the implementation of only five output levels, the number of output levels may be significantly greater. As a result, the number of different input values may also be significantly greater. By increasing the number of output levels and input values, the number of bits represented by each input value can also be increased. Accordingly, as noted above, the present invention can be used to substantially increase the data transfer rate and conserve bandwidth.

Figure 7:
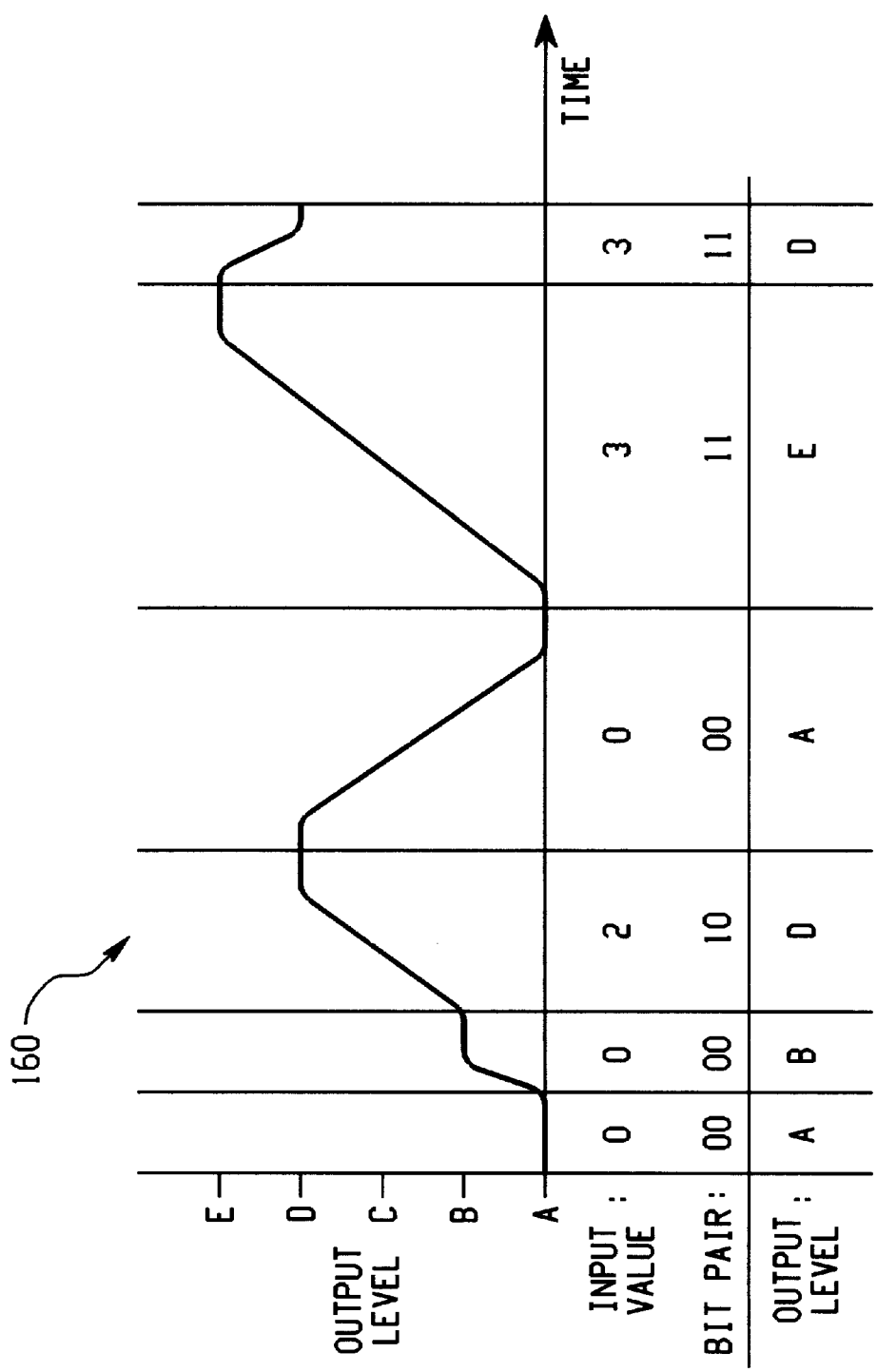
FIG. 7 is a timing diagram illustrating the encoding of four different input values.

It should also be appreciated that FIGS. 4–6 illustrate fixed timing relationship between one output level and the next solely the purpose of illustrating the present invention. In this regard, the time scale itself is completely arbitrary, and the time required to transition from one output level to another is also completely arbitrary. Accordingly, it should be understood that the present invention can maximize the use of available bandwidth by varying the timing relationship from one transition to another For example, in a bandwidth limited transmission medium, a change from one output level to a nearby output level, such as from A to B, will stabilize quickly, whereas a change from one output level to a distant output level, such as from A to E, will take longer to stabilize. Therefore, small changes can be transmitted more quickly. FIG. 7 provides a timing diagram 160 which shows the timing where stabilization of the transitions varies depending upon the relative difference between consecutive output levels. As can be seen from the diagram, the time for a single level change (e.g., A to B) takes approximately half the time needed for a change of two levels (e.g., B to D).

It should be appreciated that large changes between consecutive output levels may generate significant noise, and thus require increased bandwidth. As a result, it might be necessary in some cases to limit the changes between consecutive output levels to the nearest 50 percent of the available output levels. Therefore, there may be more than N+1 output levels for encoding N input values. For instance, an encoder having ten output levels might produce a step of one of four levels per each transition, encoding two bits at a time, but reducing the needed bandwidth of the channel.

Figure 8:
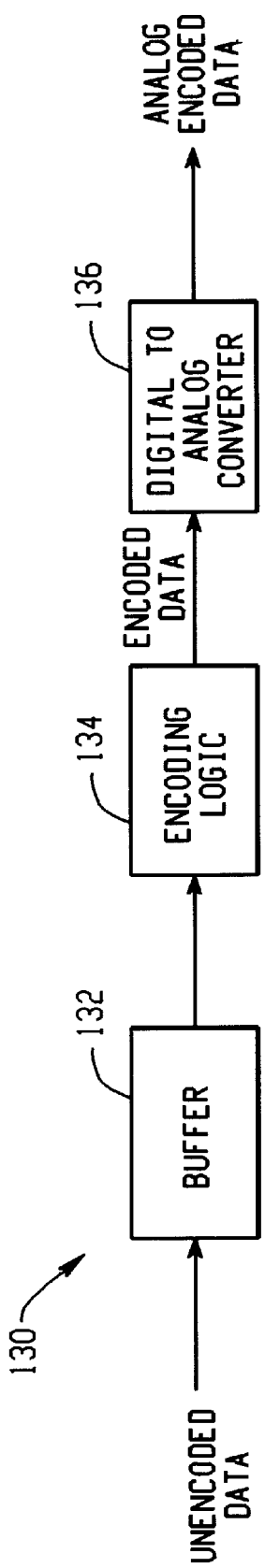
FIG. 8 is a block diagram of the hardware arrangement for implementing the encoding algorithm of the present invention.
Figure 9:
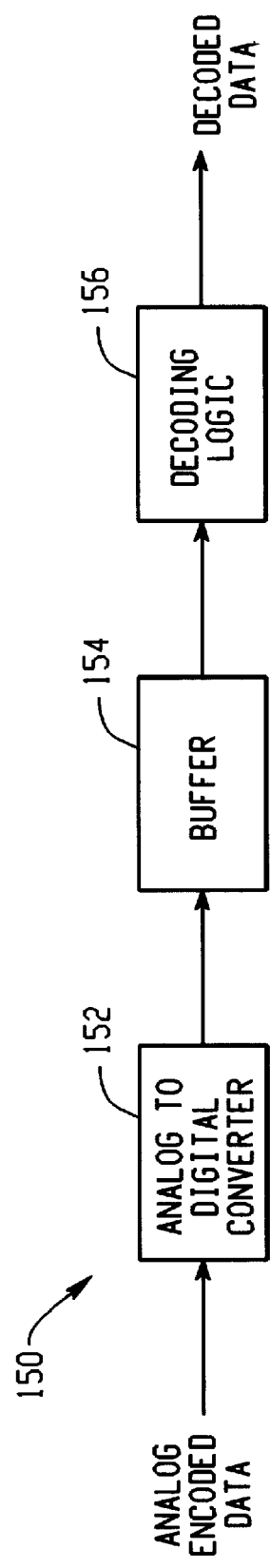
FIG. 9 is a block diagram of the hardware arrangement for implementing the decoding algorithm of the present invention.

Referring now to FIG. 8, there is shown a block diagram of a hardware arrangement 130 for encoding input values into output level transitions. Arrangement 130 is generally comprised of a buffer 132, encoding logic 134, and a digital-to-analog converter 136. In a preferred embodiment of the present invention, buffer 132 is a FIFO chip for buffering the received data. For instance, buffer 132 may take the form of a Cyprus Semiconductor CY7C464. Encoding logic 134 is programmed to implement the algorithm in the manner as described in connection with FIG. 5. In a preferred embodiment of the present invention, encoding logic 134 takes the form of an EPLD device, as the Altera EPM7128ELC. Digital-to-analog converter 136 may take the form of an 8-bit video DAC, such as the TDA8702 from Philips Components.

Arrangement 130 operates in the following manner. Unencoded data is stored in buffer 132. The unencoded data are input values which may represent one or more bits. Encoding logic 134 reads out the unencoded data and encodes it into output levels transitions which are sent to digital-to-analog converter 136. It should be appreciated that the analog coded data may be transmitted using a variety of different mediums, including a television signal. For instance, encoded data may be transmitted during the active video portion of the television signal. Accordingly, large quantities of data can be quickly and conveniently transferred.

Referring now to FIG. 7, there is shown a block diagram of hardware arrangement 150 for decoding output levels transitions into input values. Arrangement 150 is generally comprised of an analog-to-digital converter 152, a buffer 154 and decoding logic 156. Analog-to-digital converter 152 is preferably an 8-bit video ADC, such as the TDA8708B from Philips Components. In a preferred embodiment of the present invention, buffer 154 is a FIFO chip for buffering than digital data. For instance, buffer 154 may take the form of a Cyprus Semiconductor CY7C464. Decoding logic 156 is programmed to implement the algorithm in the manner as described in connection with FIG. 6. In a preferred embodiment of the present invention, decoding logic 156 takes the form of an EPLD device, such as the Altera EPM7128ELC.

Arrangement 150 operates in the following manner. Analog-to-digital converter 152 receives the encoded output levels and converts them to digital data, Buffer 154 stores the digital data. Decoding logic 156 reads out the digital data from buffer 154 and decodes the encoded output level transitions into input values. These input values in turn may be converted to one or more bits.

It should be appreciated that arrangements 130 and 150, as described above, are provided solely for the purpose of illustrating a preferred embodiment of the present invention and that numerous other arrangements are suitable as well.

As indicated above, digital data encoded as analog coded data may be transmitted using a variety of different mediums, including a television signal. In this regard, encoded data may be transmitted during the active video portion of a television signal, thus allowing for extremely high data transfer rates. A data transmission system including a system for encoding the digital data as encoded analog data and transmitting the encoded analog data as a mock television signal compatible with the NTSC standard, and a system for receiving the encoded analog data as a mock television signal compatible with the NTSC standard and decoding the encoded analog data to retrieve the original digital data, will now be described in detail. It should be appreciated that while the present invention is described with reference to a "television signal" (which includes VHF and UHF FM RF signals, cable TV signals, satellite TV signals, microwave TV signals and closed-circuit TV signals), the present invention is also applicable to other radio frequencies.

Figure 10:
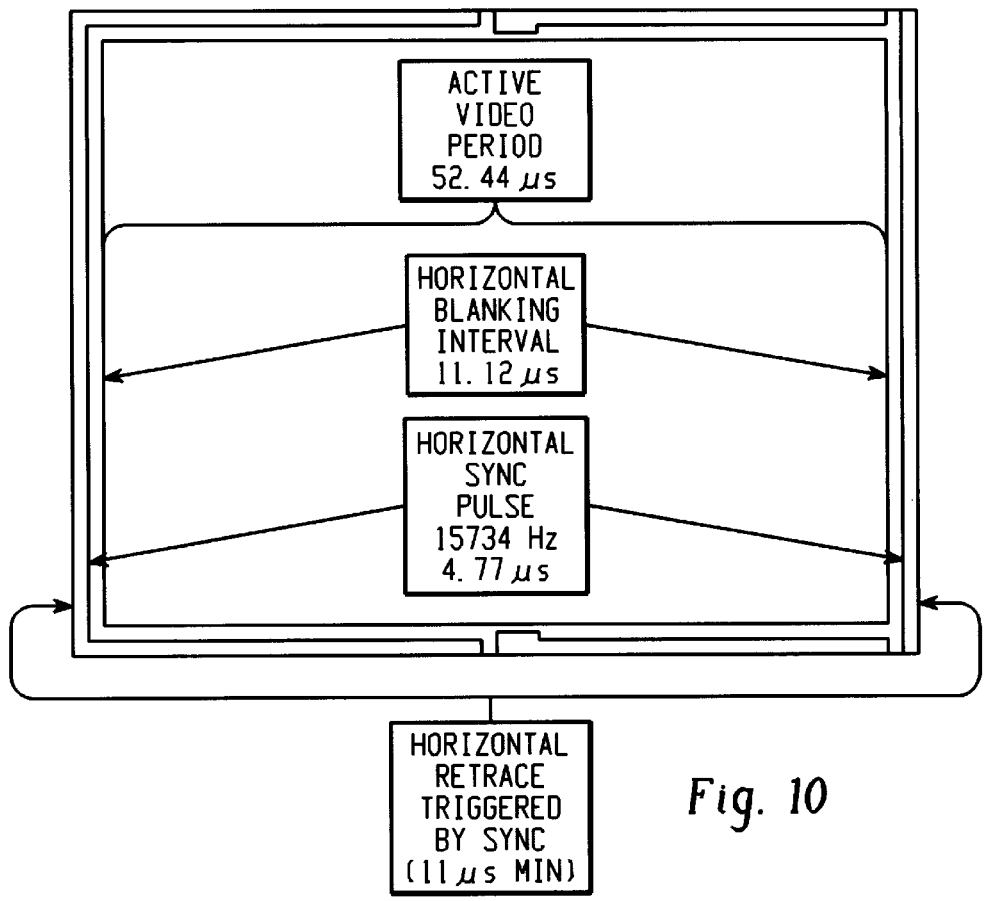
FIG. 10 is a horizontal timing pictorial for an NTSC compatible television signal.
Figure 11:
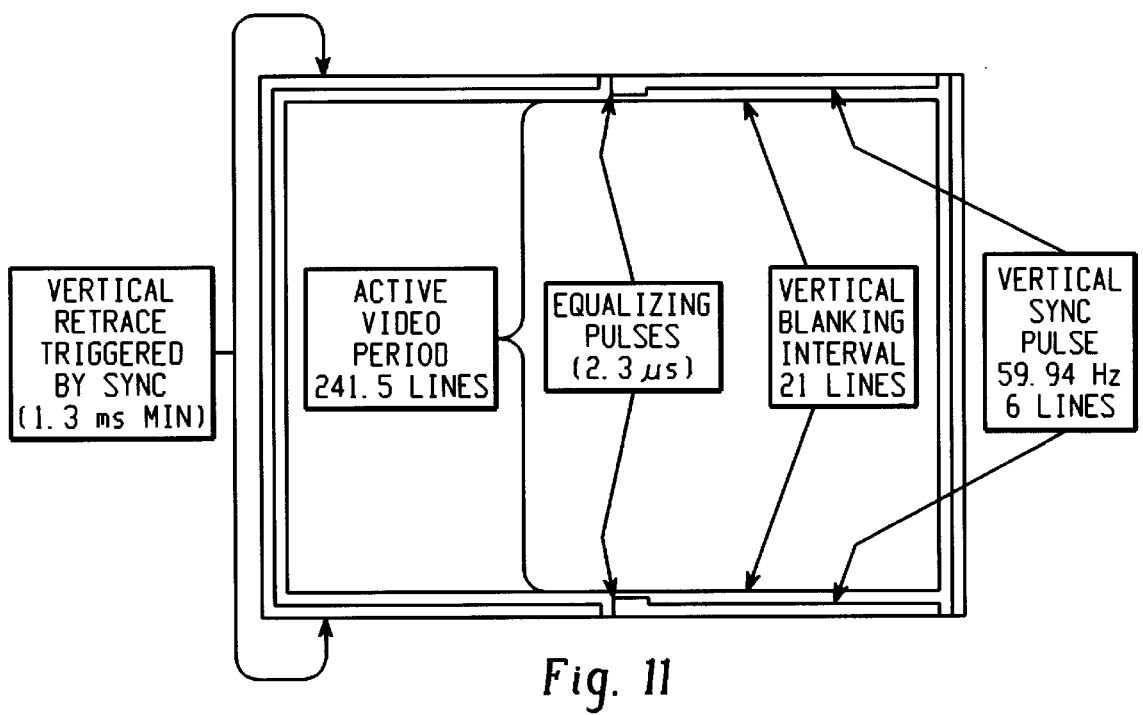
FIG. 11 is a vertical timing pictorial for an NTSC compatible television signal.

Reference is first made to FIGS. 10 and 11, which respectfully illustrate horizontal and vertical timing for an NTSC-compatible television signal. It should be appreciated that while the present invention will be described with reference to an NTSC-compatible television signal, the present invention may be modified for use with other television signal standards, including PAL, SECAM, HDTV, as well as proprietary television signals. As is well known, the NTSC specification calls for interlace scanning. A scanning pattern has 262.5 lines per field and two fields per frame. Therefore, each frame has 525 lines, which forms one complete image. Moreover, the scanning rate is 15,750 lines per second (i.e., 63.55 $\mu$sec per line), thus providing 30 frames per second (i.e., 60 fields per second). It should be understood that the value 15,750 lines per second and 60 fields per second are approximate values. The actual values are dependent upon whether a color or black & white television signal standard is being used. In a preferred embodiment of the present invention frequencies for a color signal are used, thus there are 15734.265 scan lines per second and 59.94 fields per second. However, approximate values are used herein for the purpose of describing the present invention.

To prevent horizontal retrace lines from being observed on the screen as the electron beam scans horizontally across the screen to begin a tracing a new line, a horizontal blanking pulse is applied to the video signal, the leading edge of which precedes the leading edge of a horizontal synchronizing pulse. Accordingly, a horizontal blanking interval of 11.122 $\mu$sec is established, during which a horizontal synchronizing pulse lasting 4.77 $\mu$sec is generated. Since the horizontal blanking period is 11.122 $\mu$sec (including the 4.77 $\mu$sec for the horizontal synchronizing pulse) and there are 63.555 μsec per line, this leaves 52.433 μsec for an active video period per line, during which visual information is displayed (FIG. 10).

Similarly, to prevent vertical retrace lines from being observed on the screen as the electron beam scans vertically across the screen to begin tracing another field, a vertical blanking pulse is applied to the video signal (FIG. 11). Accordingly, a vertical blanking interval of 21 lines (i.e., 1.334 millisec) is established, during which a vertical synchronizing pulse (0.381 millisec) and equalizing pulses (2.3 μsec each) are generated. Since the vertical blanking period is 21 lines or 1.333 millisec (including the 0.381 millisec for the vertical synchronizing pulse and the 2.3 μsec for equalizing pulses), this leaves only 241.5 lines (15.33 millisec) for an active video period per field, (FIG. 11). Of course, some of this active video period per field will be unavailable for displaying information due to the horizontal blanking interval described above.

The NTSC standard waveform is divided into five phases: pre-equalization, serration, post-equalization, subphase and "video active". The first four phases occur during the vertical blanking interval, while the "video active" phase occurs during the active video period and the horizontal blanking interval.

In a preferred embodiment of the present invention the active video period of the television signal is used to transmit encoded digital data. At the same time, "mock" blanking, synchronizing, and equalizing pulses are generated to comply with the NTSC standard. However, it should be appreciated that the present invention is suitably modified to also transmit encoded digital data during horizontal and vertical blanking intervals, since in actuality the present invention makes no use of the signals generated during these intervals. The "mock" signals are generated solely to comply with the requirements of the NTSC standard.

Figure 12:
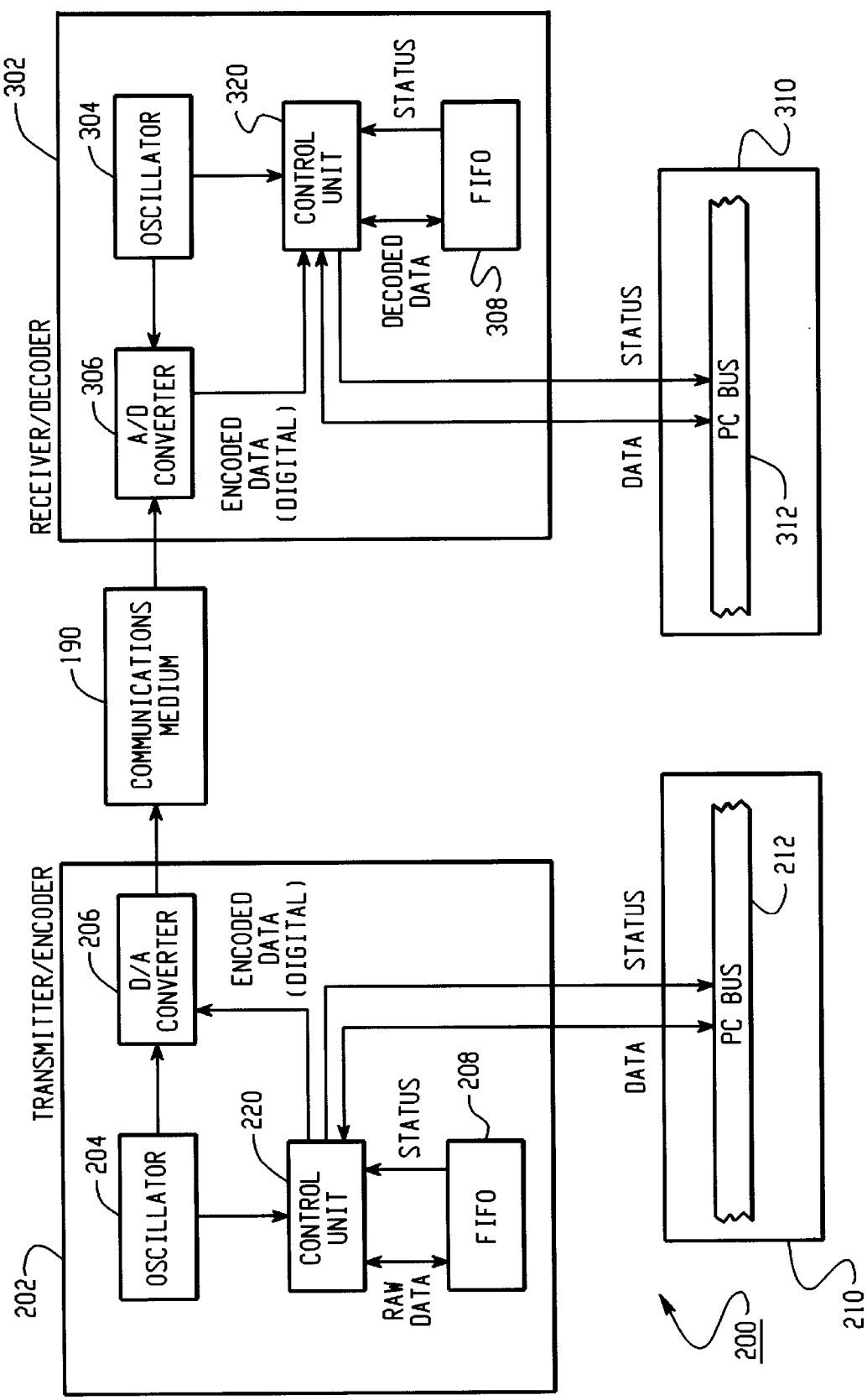
FIG. 12 is a block diagram of the television signal data transmission system, according to a preferred embodiment of the present invention.

Referring now to FIG. 12, there is shown a block diagram of television signal data transmission system 200. Data transmission system 200 is generally comprised of a transmitter/encoder 202, a receiver 302, general purpose computer systems 210 and 310, and a communications medium 190. Transmitter/encoder 202 includes an oscillator 204, a digital-to-analog (D/A) converter 206, a control unit 220 and a FIFO (First-In-First-Out) memory 208. Oscillator 204 provides a clock signal to both D/A converter 206 and control unit 220. Oscillator 204 takes the form of a suitable high speed crystal oscillator of approximately 25 MHz (e.g., 25.175 Mhz) or other suitable frequency. D/A converter 206 receives encoded data in a digital form from control unit 220, and converts it to corresponding analog data. In a preferred embodiment of the present invention D/A converter 206 takes the form of an 8-bit video D/A converter, such as the TDA8702 from Philips Components. Control unit 220 performs the operations necessary to encode data, as will be described in detail below. Control unit 220 communicates with FIFO (first-in-first-out) memory 208 and with computer system 210 (via PC bus 212). In this regard, control unit 220 receives status data from FIFO 208 and sends/receives data to/from FIFO 208. FIFO 208 stores the raw data to be encoded. Control unit 220 also send status data to computer system 210 and sends/receives data to/from computer system 210. In a preferred embodiment of the present invention, control unit 220 takes the form of a suitable logic device, such as an EPLD, PAL, GAL, PLD, FPGA, ASIC or CPU. For purposes of illustrating a preferred embodiment of the present invention control unit 220 takes the form of an Altera EPM7128ELC EPLD. Importantly, the EPLD provides for parallel logic, which allows for simultaneous operations. In a preferred embodiment of the present invention FIFO 208 takes the form of a Cyprus Semiconductor CY7C464.

It should be appreciated that a preferred embodiment of transmitter/encoder 202 does not include a standard 3.58 MHz color reference oscillator. In this regard, a "mock" black & white signal is generated, in order to attain higher bandwidth available for encoding data.

Receiver/decoder 302 includes an oscillator 304, an analog-to-digital (D/A) converter 306, a control unit 320 and a FIFO (First-In-First-Out) memory 308. Oscillator 304 provides a clock signal to both D/A converter 306 and control unit 320. Oscillator 304 takes the form of a suitable high speed crystal oscillator of approximately 25 MHz (e.g., 25.175 Mhz), or other suitable frequency. A/D converter 306 receives encoded data in a digital form from control unit 320, and converts it to corresponding analog data. In a preferred embodiment of the present invention A/D converter 306 takes the form of an 8-bit video A/D converter, such as the TDA8708B from Philips Components. Control unit 320 performs the operations necessary to decode data, as will be described in detail below. Control unit 320 communicates with FIFO 308 and with computer system 310 (via PC bus 312). In this regard, control unit 320 receives status data from FIFO 308 and sends/receives data to/from FIFO 308. FIFO 308 stores the decoded data. Control unit 320 also send status data to computer system 310 and sends/receives data to/from computer system 310. In a preferred embodiment of the present invention, control unit 320 takes the form of a suitable logic device, such as an EPLD, PAL, GAL, PLD, FPGA, ASIC or CPU. For purposes of illustrating a preferred embodiment of the present invention control unit 320 takes the form of an Altera EPM7128ELC EPLD. As noted above, the EPLD provides for parallel logic, which allows for simultaneous operations. In a preferred embodiment of the present invention FIFO 308 takes the form of a Cyprus Semiconductor CY7C464.

In a preferred embodiment of the present invention, computer systems 210 and 310 take the form of an 80×86 or Pentium based personal computer (PC). However, computer systems 210, 310 are not limited to personal computers, and may take other forms, including a SUN Sparc station, Silicon Graphics Workstation, and a set-top satellite receiver. It should be appreciated that in a preferred embodiment of the present invention transmitter/encoder 202 and receiver/decoder 302 take the form of plug-in PC boards which respectively interface with PC buses 212, 312 of computer systems 210, 310.

Communications medium 190 may take the form of any medium suitable for transmission of television signals, including a cable system, a satellite system, a microwave system, a closed-circuit system, or an over-the-air broadcast system.

Data transmission system 200 operates in the following manner, Computer system 210 sends raw data (digital) to control unit 220. In turn, control unit 220 stores the raw data in FIFO 208. Simultaneous with this operation, control unit 220 reads raw data from FIFO 208 and encodes the raw data as part of an encoded NTSC compatible television signal, as will be described in detail below. The encoded data, which is still in digital form, is fed to D/A converter 206 for conversion to analog form. The analog encoded data is then transmitted via communications medium 190 to receiver 302. A/D converter 306 receives the analog encoded data and converts it to digital form. In turn, control unit 320 stores the encoded data in FIFO 302. Simultaneous with this operation, control unit 320 reads the encoded data from FIFO 308 and decodes the data to obtain the original raw data, as will be described in detail below. Control unit 320 sends the decoded data to computer system 310. The decoded data may be displayed by computer system 310 on a monitor, in a case where the decoded data represents visual data.

It should be understood that the foregoing hardware configuration is described solely for the purpose of illustrating a preferred embodiment of the present invention, and that numerous other hardware configurations are also suitable for carrying out the present invention.

The encoding operation performed by control unit 220 will now be described in detail. It should be understood that the encoding operation will be described with reference to the encoding of four input values (i.e., 0, 1, 2, and 3) into five output levels (i.e., output levels A, B, C, D and E), according to the system of encoding described in detail above. Each input value represents a respective bit pair (i.e., 00, 01, 10, 11). Accordingly, a byte (8 bits) of data is defined by a set of four input values. The specific system of encoding, and the number of input values and output levels are exemplary, and are thus provided solely for the purpose of illustrating a preferred embodiment of the present invention, and not for limiting same.

As a part of the encoding operations, control unit 220 performs basically two sets of operations. The first set of operations is to encode the appropriate NTSC signals for the first four phases of the NTSC television signal, namely, pre-equalization, serration, post-equalization, and subphase. These first four phases include the vertical blanking pulse, equalizing pulses and vertical synchronizing pulses. The second operation is to encode the appropriate NTSC signals for the fifth phase (i.e., "video active" phase) of the NTSC television signal. The "active video" phase includes the horizontal blanking pulses, horizontal synchronizing pulses, as well as the encoded bit pairs.

Figures 13, 14A:
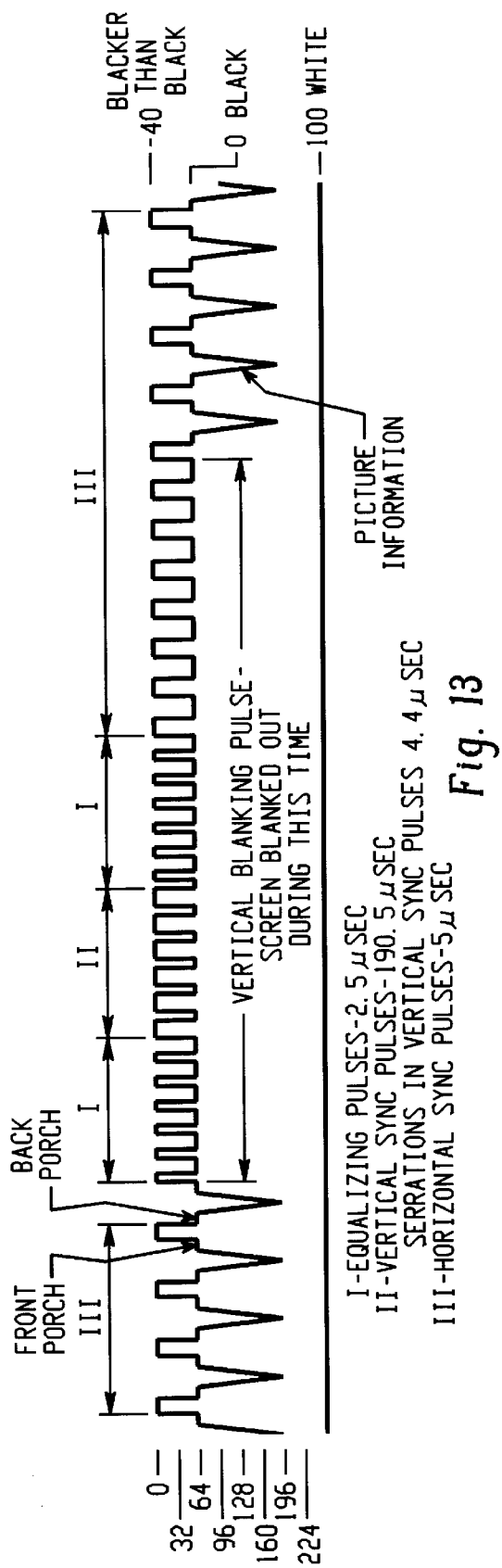
FIG. 13 is an NTSC television signal waveform for a black and white television transmission.
FIG. 14A is a table showing the states of the encoder state machine and corresponding outputs of the encoder.

It should be appreciated that the NTSC television signal waveform has a range of voltages that corresponds to different degrees of brightness. Referring now to FIG. 13, there is shown an NTSC television signal waveform for a black and white transmission. The "picture information" ranges from "black" (IRE level 0) to "white" (IRE level 100). The picture information will correspond to the encoded bit pairs. The vertical blanking pulses, vertical synchronizing pulses, equalizing pulses, horizontal blanking pulses, and horizontal synchronizing pulses range from "black" (IRE level 0) to "blacker than black" (IRE level −40). A digital output value is assigned to each required output voltage level. The voltage range from white to "blacker than black" has been considered and an appropriately spaced digital output value has been assigned thereto. In this respect, a digital output value of 0 is assigned to "blacker than black" and subsequent digital output values are assigned at appropriate increments.

The state of the encoder state machine and corresponding outputs are shown in the TABLE 1 of FIG. 14A. Control unit 220 presents digital encoded data to D/A converter 206, which in turn converts the digital encoded data to analog encoded data. The digital encoded data is an 8-bit binary number. The 3 most significant bits (MSB) of the 8-bit binary number will vary depending upon the encoded output information. The remaining five bits of the digital encoded data are fixed to zero. As a consequence, the possible values for the digital encoded data are 0, 32, 64, 96, 128, 160, 192 and 224, where each value corresponds to different encoded output information. Digital encoded data values 224,192, 160,128 and 96 correspond respectively to output levels E, D, C, B and A/Idle. It should be understood that "idle" refers to a pause in the transmission of data. Digital encoded data value 64 indicates horizontal and vertical blanking pulses, while digital encoded data value 0 indicates horizontal and vertical synchronizing pulses, as well as equalization pulses. Digital encoded data value 32 is unused because no encoded information requires a voltage level between the voltage level corresponding to digital encoded data values 64 and 0. Moreover, there is a need to preserve the difference in voltage levels between the levels for blanking and synchronizing in order to comply with the NTSC standard.

Figure 14B:
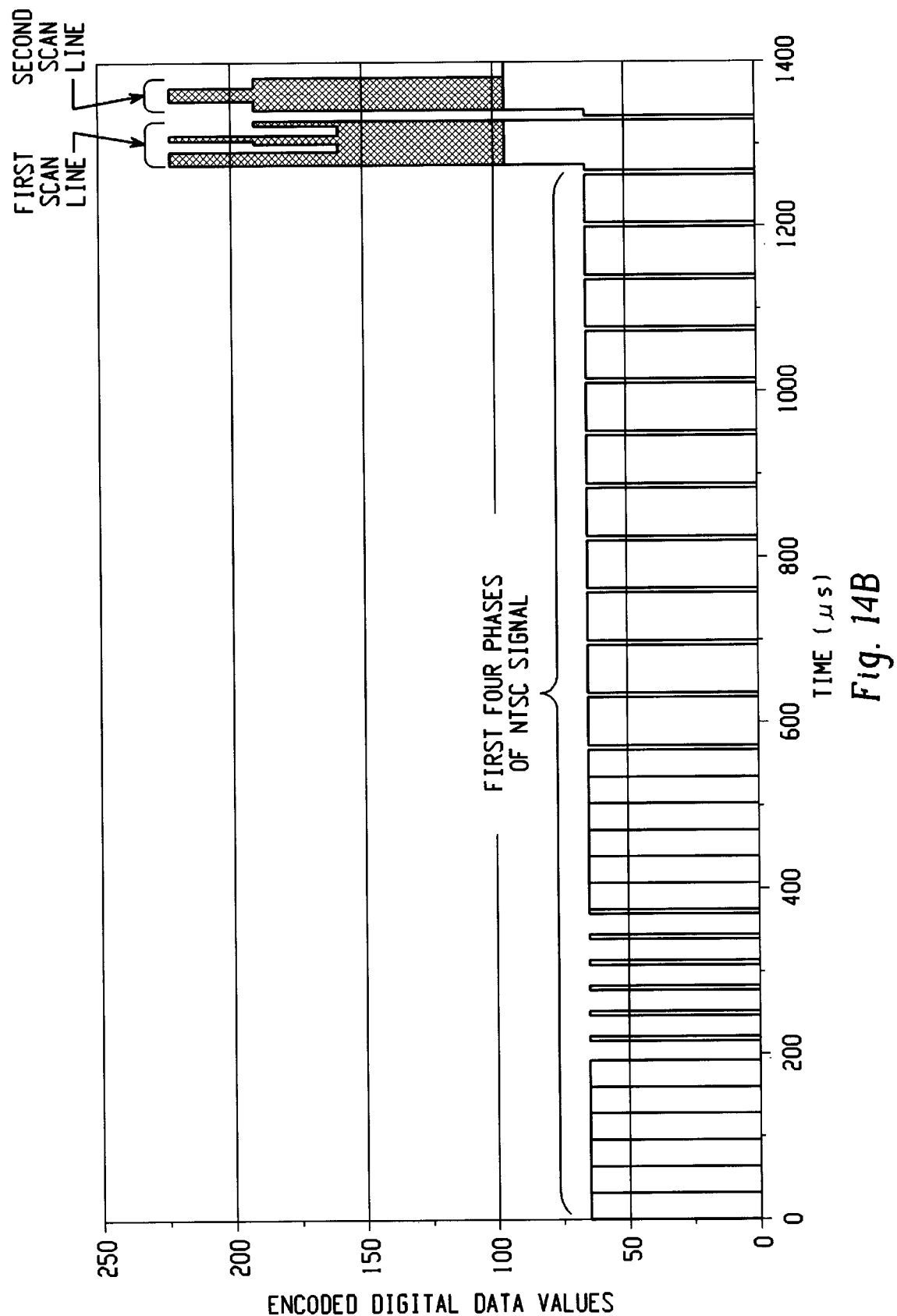
FIG. 14B is a timing diagram showing the digital encoded data for the first four phases of an NTSC signal and the first two scan lines of the active video phase.
Figure 14C:
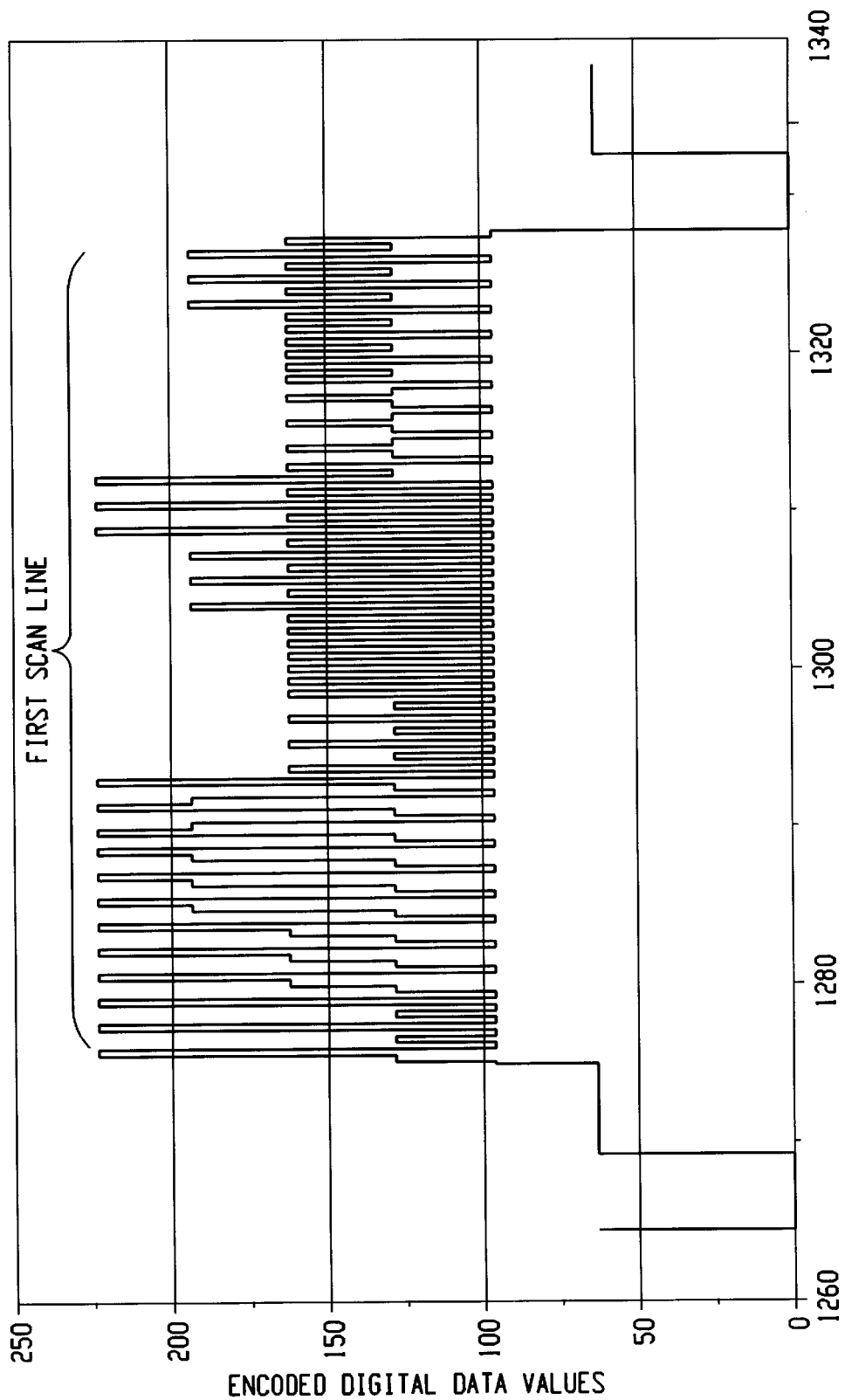
FIG. 14C is a timing diagram showing the digital encoded data for the first scan line shown in FIG. 14B.
Figure 14D:
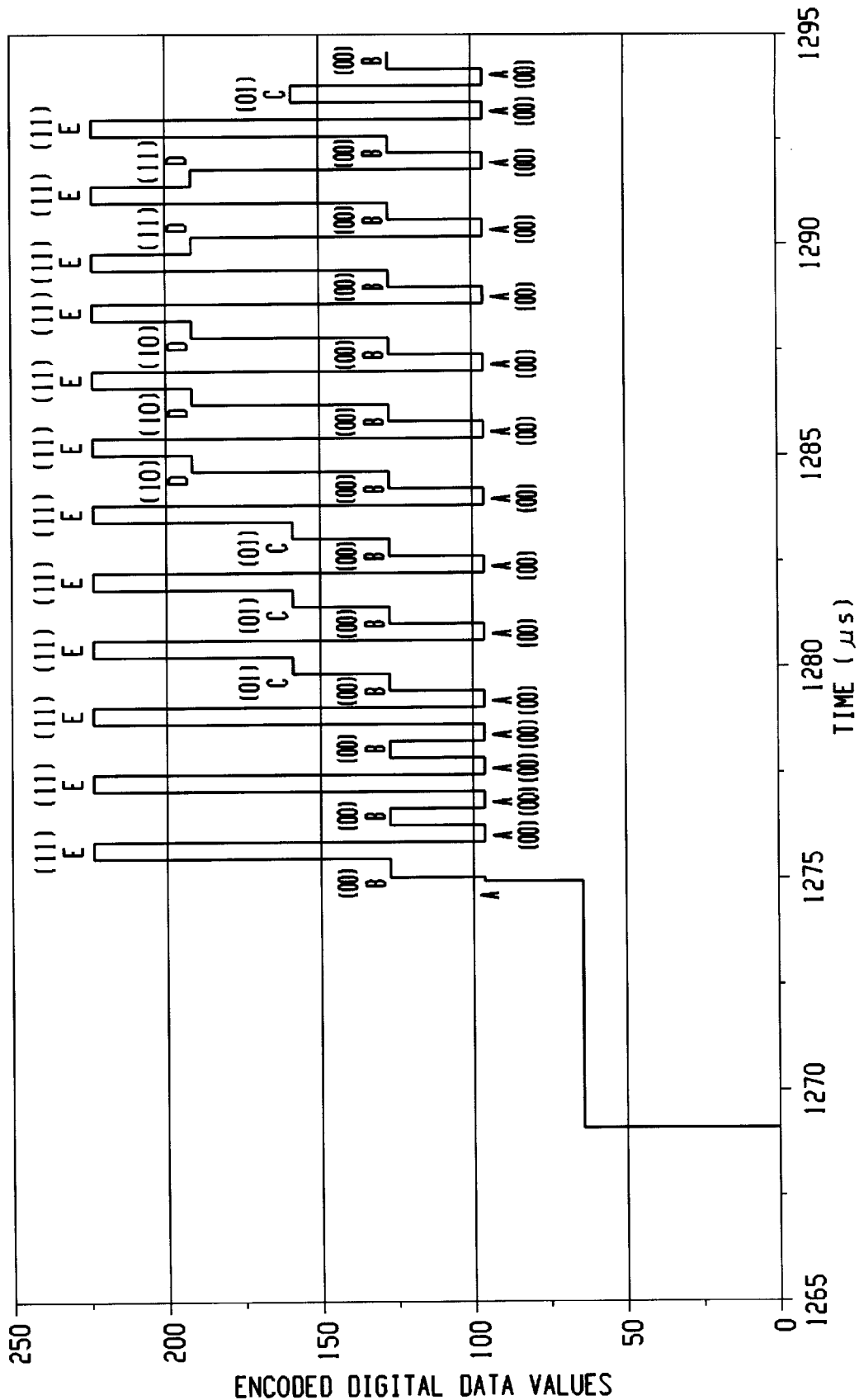
FIG. 14D is a timing diagram showing the digital encoded data for a portion of the first scan line shown in FIG. 14C.

Referring now to FIG. 14B, there is shown a timing diagram showing the encoded digital data for the first four phases of the NTSC signal (which includes vertical blanking pulses, vertical synchronizing pulses and equalizing pulses) and the first two scan lines of an active video phase. The encoded digital data shown in FIG. 14B is input to the digital-to-analog converter. As can be seen, the digital encoded data for the first four phases of the NTSC signal will toggle between 64 and 0. As noted above, the digital encoded data value of 32 is skipped in order to preserve the appropriate difference in voltage for the vertical blanking pulses, vertical synchronizing pulses and equalizing pulses, according to the NTSC standard. FIG. 14C provides a more detailed view of the digital encoded data for the first scan line, shown in FIG. 14B. FIG. 14D shows a portion of the first scan line shown in FIG. 14C. This timing diagram shows transitions between the levels A thru E for encoding bit pairs. In this regard, the first transition of the scan line is from level A to level B, which encodes bit pair "00." The next transition from level B to level E encodes bit pair "11." Four transitions encodes a byte of data. It should be appreciated that according to a preferred embodiment of the present invention, the bit pairs are encoded in the order of least significant bit pair to most significant bit pair. Therefore, in the example shown in FIG. 14D, the first byte of data is actually "00 00 11 00" or 12 (base 10).

For the first set of operations, the EPLD (i.e., control unit 220) is programmed as a state machine to generate digital representations of the appropriate NTSC waveform signals for the first four phases of the NTSC signal, as discussed above. The control logic for carrying out this first set of operations is a part of the EPLD program code listing set forth below:

Function description
This macro function takes as inputs a clock and an active low reset signal and generates a digital
representation of the NTSC control signals CSYNC, HD, VD, FIELD, BURST and BLANK. These signals
may then be used to control video imaging or display equipment. To implement a complete NTSC pattern
the macro function has a 5-state machine with the following states: PRE-EQUALIZATION,
EQUALIZATION POST_EQUALIZATION, SUB_PHASE and VIDEO_ACTIVE. During each of these
distinct states the outputs are generated according to a different set of rules, and the AHDL state machine
controls this output generation.

-continued

It should be noted that 910 was the old line length, based on a 14.318 Mhz oscillator. The horizontal frequency was 15734.26373626 Hz, which is the standard for NTSC. The present embodiment uses a 25.175 Mhz oscillator, and a line length of 1600. The horizontal frequency will be 15734.375 Hz (up by 7 ppm). The horizontal state machine trigger points are scaled by 160191 counts.
Each horizontal line contains 1600 (was 910) pixels, and the NTSC macro function treats each line as a pair of half-lines. Accordingly, the HCNT_ROLL_OVER is set to 798(was 453) (one less than the half line max count of 799 (was 454) which when multiplied by two gives a total of 1600 (was 910) pixels).
The constant VCNT_ROLL_OVER is set to 525 representing the 525 lines per screen as specified in standard NTSC format. Because the format provides for interlacing, each screen contains two frames, each of which has 262.5 lines. Since non-integer counters are very hard to control, the system counts to 525 halflines and then repeats this count sequence for the second frame. The two frames are offset by one-half line, so when their analog video data is taken together it forms a complete picture.
For more detailed information on NTSC pattern generation reference is made to the NTSC standards, or textbook on video applications.
*****************************************************************************************************
PATTERN CONSTANTS SECTION
Constants shown for phase conditions (e.g.: START_PRE_EQ) are decoded off the vertical counter. State transitions are based on the line that is currently being decoded. The values are shown as binary numbers (denoted by the B"xxxx" format), and represent the gray-code values corresponding to the decimal values shown to the right of each line in a comment.
Constants for the J and K inputs (e.g.: HD_J) are also gray-code values, with the corresponding decimal value shown in a comment. These constants are compared with the horizontal counter to make pulses in the output signals.
The constants with names that begin with "START" are starting points for the corresponding named NTSC phase. For this model we assume that the NTSC standard has 5 phases "pre-equalization (PRE-EQ), serration (SERRA), post-equalization (POST_EQ), sub-phase (SUB_PH) and video-active (VID_ACT). They each start at defined vertical lines, and these are set by the first five constants below. Since they are decoding a gray-coded counter, the equivalent decimal value is shown (e.g., video active starts on the 20th line in the scan).

```
CONSTANT START_PRE_EQ    =B"0000000000"; % line 0     D"0" %
CONSTANT START_SERRA     =B"0000000101"; % line 3     D"6" %
CONSTANT START_POST_EQ   =B"0000001010"; % line 6     D"12" %
CONSTANT START_SUB_PH    =B"0000011011"; % line 9     D"18" %
CONSTANT START_VID_ACT   =B"0000111100"; % line 20    D"40" %
CONSTANT ONE_LINE_LEFT   =B"1100001010"; % line 524%
```

These constants define the transitions on the various NTSC output signals during the 5 phases of the NTSC standard. in each case the constant shown represents a value that is compared to the horizontal pixel counter. in the case of the CSYNC signal the output depends on the current phase, so there are 5 constants given to completely specify the operation. HD, BLANK and BURST all behave the same in all 5 of states, so only one constant pair is given. Note that there is always a "J" and a "K" constant given. This is because of the output pulses on all the output signals must be turned on and then turned off again at specific horizontal count values. The "J" is routed to the J input of a JK flipflop (and hence will assert the output when true) and the "K" is routed to the K input to a JK flipflop (and hence will deassert the output when true).
By setting the value of CSYNC_PRE_EQ_J to the gray-code equivalent of decimal 36, the CSYNC signal will be asserted at the 36th horizontal count. By setting CSYNC_PRE_EQ_K equal to the gray-code equivalent to decimal 1 CSYNC will be deasserted at the first horizontal count. During the pre-equalization phase there are 6 "halflines" (as defined by the constant START_SERRA being set to the gray-code equivalent of decimal 6) so the CSYNC signal will make 6 pulses during pre-equalization phases. For this reason, the falling edge at the 1st point in a horizontal scan ends the high-level signal for the previous line. Since CSYNC is an active low signal, this makes a pulse that lasts from the 1st to the 36th count on the horizontal scan, and then repeats for a total of 6 lines.
The active-low CSYNC signal would look like this during the pre-equalization phase. The first (falling) edge would occur when the horizontal counter is equal to the gray-code equivalent of "1" and the second (rising) edge would occur when the horizontal counter is equal to the gray-code equivalent of "36". Note that these edges should technically occur at "0" and "35", but to avoid synchronization problems with the boundary between the two frames in the interlaced screen format, they are all offset one.
All of the conditional phase and counter value testing is done in the "WHEN pre_eq" statement in the state machine CASE statement block. Corresponding WHEN statements are provided for all of the 5 NTSC phases, and in each WHEN statement there are definitions for each of the 6 output signals during each of those states.

```
CONSTANT CSYNC_PRE_EQ_J    =B"0000100000"; %   D"63"    Was 36%
CONSTANT CSYNC_PRE_EQ_K    =B"0000000001"; %   D"1"     %
CONSTANT CSYNC_SERRA_J     =B"1111111000"; %   D"687"   Was 391%
CONSTANT CSYNC_SERRA_K     =B"0000000001"; %   D"1"     %
CONSTANT CSYNC_POST_EQ_J   =B"0000100000"; %   D"63"    Was 36%
CONSTANT CSYNC_POST_EQ_K   =B"0000000001"; %   D"1"     %
CONSTANT CSYNC_SUB_PH_J    =B"0001000100"; %   D"120"   Was 68%
CONSTANT CSYNC_SUB_PH_K    =B"0000000001"; %   D"1"     %
CONSTANT CSYNC_VID_ACT_J   =B"0001000100"; %   D"120"   Was 68%
CONSTANT CSYNC_VID_ACT_K   =B"0000000001"; %   D"1"     %
CONSTANT HD_J              =B"0011110000"; %   D"160"   Was 91%
CONSTANT HD_K              =B"0000000001"; %   D"1"     %
CONSTANT BLANK_J           =B"0110001000"; %   D"271"   Was 154%
CONSTANT BLANK_K           =B"0000000001"; %   D"1"     %
CONSTANT BURST_J           =B"0010110001"; %   D"222"   Was 126%
CONSTANT BURST_K           =B"0011000110"; %   D"132"   Was 75%
```
*****************************************************************************************************

-continued

COUNTER CONSTANTS SECTION
These constants specify rollover and terminal count values. 453 is the end of the first halfline. Halflines are used to accommodate the interlacing scheme specified by NTSC. By using halflines it is possible to use an integer value to count the lines per screen. If full-lines were used then it would be necessary to count 262.5 (a half line) and then switch frames. That is a very unpleasant task, counting in non-integer mode using digital logic.
The VCNT value of 525 is the end of the first frame in the two frame interlaced model. These values may be changed to match other video display formats.

```
CONSTANT HCNT_ZERO        =B"0000000000"; %   % D"0" for start value %
CONSTANT HCNT_ROLL_OVER   =B"1010010001";     % D"798" for hhalf       Was 453%
CONSTANT VCNT_ROLL_OVER   =B"1100001010";     % D"524"                 %
CONSTANT VCNT_HALF_LINE   =B"1100001011";     % D"525" for testing.    %
CONSTANT VCNT_HALF_LINE2  =B"1100001010";     % D"524" for testing.    %
SUBDESIGN dvsv1e
(
a[15..0] : INPUT;           -- Address inputs from PC BUS
ior : INPUT;                -- I/O Read input from PC BUS
iow : INPUT;                -- I/O Write input from PC BUS
aen : INPUT;                -- Address Enable input from PC BUS
w02bf : OUTPUT;             -- write to address 0x02bf output (write to FIFO)
d[7..0] : BIDIR;            -- Data bus I/O lines from PC BUS
pafe : INPUT;               -- Full flag status from FIFO
eorf : INPUT;               -- Empty flag status from FIFO
hf : INPUT;                 -- Half full flag status from FIFO
sw[7..0] : OUTPUT;          -- Write data lines to FIFO
irq_pin : OUTPUT;           -- Programmable IRQ pin from PC BUS
dreq_pin : INPUT;           -- Programmable DREQ pin from PC BUS DMA REQUEST
dack_pin : OUTPUT;          -- Programmable DACK pin from PC BUS DMA
ACKNOWLEDGE
pin_do[7..0] : OUTPUT;      -- Encoded output to video DAC
ck25 : INPUT;               -- 25.175 Mhz master system clock
fr : OUTPUT;                -- Read signal to FIFO
f[7..0] : INPUT;            -- Read data lines from FIFO
reset: INPUT;               -- PC BUS reset signal
)
VARIABLE
%
    line_decode is a state machine used to control the NTSC waveforms. The outputs csync, hsync,
    vsync, field_ff, blank and burst are all created using JK flipflops.
%
csync,           % NTSC output signals   %
--hd,
vd,
---fld,
blank: NODE;
---burst : NODE;
    line_decode: MACHINE
                OF BITS        (    q[2..0])
                WITH STATES    (    _power_up ,
                                    _pre_eq ,
                                    _serra ,
                                    _post_eq ,
                                    _sub_ph ,
                                    _vid_act
                               );
gclk          :          NODE;    % Global clock node %
grst          :          NODE;    % Global reset node %
csync_ff      :          JKFF;    % Composite Sync signal %
---hd_ff      :          JKFF;    % Unneeded in this design %
vd_ff         :          JKFF;    % Vertical deflection signal %
--fld_ff      :          JKFF;    % Unneeded in this design %
blank_ff      :          JKFF;    % Blanking signal %
---burst_ff   :          JKFF;    % Unneeded in this design %
pwr_up        :          NODE;
cnt_reset     :          NODE;
%
    Counter variables. Eleven bits for lines per screen (10 in the counter, and line_ff as the terminal
    bit), and ten bits for pixels per line (9 in the counter and h_odd as the terminal bit).
%
    v[9..0]       :          TFF;    % Vertical counter bits %
    h[9..0]       :          TFF;    % Horizontal counter bits %
    line_ff       :          TFF;    % First/second halfline_ff %
    h_odd         :          TFF;    % Odd horizontal bit %
    field_ff      :          TFF;    % Odd/even field_ff indicator %
    vcnt_reset    :          NODE;   % Terminal/reset condition %
    hcnt_reset    :          NODE;   % Terminal/reset condition %
r02be : NODE;                        -- Read from address 0x02be (status request)
d[7..0] : NODE;                      -- Data bus inputs
tri_d[7..0] : TRI ;                  -- Data bus tri-state outputs
```

-continued

```
sw[7..0] : DFFE;                    -- Outputs to FIFO
pin_do7 : DFFE;                     -- Outputs to DAC, the other 5 bits are always 0, so the 224
signal.
cnt[11..0] : DFFE;                  -- Internal counters; this is an 8 bit and a 4 bit
                                    -- combined. The low 4 bits count from 0 to 9 and then
                                    -- reset to 0 again; the high 4 bits count from 0 to 132
                                    -- and then hold while we wait for blanking to come around
                                    -- again. This allows 132 transitions per line; each one is
                                    -- .3972us long, giving us an active video time of 52.433us.
                                    -- The other 11.122us is blanking and sync, giving us 63.555us
                                    -- total time per scan line.
                                    -- decade count
                                    -- and the high 2 bits are used to track which bit pair we are
                                    -- sending.
valid : DFFE;                       -- this indicates that we are sending a valid byte.
fr: DFFE;                           -- this is the data frame sync
data00 : NODE;                      -- these are for encoding bit pairs
data01 : NODE;
data10 : NODE;
data11 : NODE;
dataend : DFFE;                     -- this indicates that we are done sending a byte.
dataend1 : DFFE;                    -- 1 clock delayed signal of dataend.
SM_dvsv100: MACHINE
    OF BITS (do7_bit do6_bit do5_bit)
    WITH STATES (
        zero = H"0",                -- state 0, when in sync
        two  = H"2",                -- state 2, when in blanking too.
        four = H"4",
        five = H"5",
        six  = H"6",
        seven = H"7");
BEGIN
DEFAULTS
  dataend1 = GND;                   -- Normally not end of data frame
  fr = VCC;                         -- fr is low true, normally not frame start
END DEFAULTS;
    gclk = GLOBAL(ck(25);           -- Global 25.175Mhz clock
    grst = !reset;                  -- Global reset (low true) signal
%
    Set up flipflop and state machine clocks and clears
%
    line_decode.clk     =   gclk;
    line_decode.reset   =   grst;
    v[ ].clk            =   gclk;
    h[ ].clk            =   gclk;
    h_odd.clk           =   gclk;
    field_ff.clk        =   gclk;
    line_ff.clk         =   gclk;
    vd_ff.clk           =   gclk;
--- hd_ff.clk           =   gclk;
    csync_ff.clk        =   gclk;
--- fld_ff.clk          =   gclk;
    blank_ff.clk        =   gclk;
--- burst_ff.clk        =   gclk;
%
    Define State Transitions
%
    CASE (line_decode) IS
        WHEN_power_up       =>
            pwr_up          =   VCC;
            cnt_reset       =   VCC;
            csync_ff.j      =   VCC;
---         hd_ff.j         =   VCC;
            vd_ff.k         =   VCC;
---         fld_ff.k        =   VCC;
            blank_ff.k      =   VCC;
---         burst_ff.j      =   VCC;
            line_decode     =   pre_eq;
        WHEN_pre_eq         =>
            csync_ff.j      =   (h[ ] == CSYNC_PRE_EQ_J);
            csync_ff.k      =   (h[ ] == CSYNC_PRE_EQ_K);
            vd_ff.k         =   VCC;
---         hd_ff.j         =   ((h[ ] == HD_J) & !line_ff & !field_ff)
---                         #   ((h[ ] == HD_J) & !line_ff & field_ff);
---         hd_ff.k         =   ((h[ ] == HD_K) & !line_ff & !field_ff)
---                         #   ((h[ ] == HD_K) & !line_ff & field_ff);
---         fld_ff.k        =   VCC;
            blank_ff.k      =   VCC;
---         burst_ff.j      =   VCC;
```

```
              IF (v[ ] == START_SERRA) THEN
                     line_decode = _serra;
              END IF;
        WHEN _serra       =>
              csync_ff.j    =      (h[ ] == CSYNC_SERRA_J);
              csync_ff.k    =      (h[ ] == CSYNC_SERRA_K);
---           hd_ff.j       =      ((h[ ] == HD_J) & !line_ff & !field_ff)
---                         #      ((h[ ] == HD_J) & !line_ff & field_ff);
---           hd_ff.k       =      ((h[ ] == HD_K) & !line_ff & !field_ff)
---                         #      ((h[ ] == HD_K) & !line_ff & field_ff);
---           vd_ff.k       =      VCC;
---           fld_ff.j      =      VCC;
              blank_ff.k    =      VCC;
___           burst_ff.j    =      VCC;
              IF (v[ ] == START_POST_EQ) THEN
                     line_decode =_post_eq;
              END IF;
        WHEN _post_q      =>
              csync_ff.j    =             h[ ] == CSYNC_POST_EQ_J;
              csync_ff.k    =             h[ ] == CSYNC_POST_EQ_K;
---           hd_ff.j       =   ((h[ ] == HD_J) & !line_ff & !field_ff)
---                         # ((h[ ] == HD_J) & !line_ff & field_ff);
---           hd_ff.k       =      ((h[ ] == HD_K) & !line_ff & !field_ff)
---                         #  ((h[ ] == HD_K) & !line_ff & field_ff);
              vd_ff.k       =      VCC;
---           fld_ff.j      =      VCC;
              blank_ff.k    =      VCC;
---           burst_ff.j    =      VCC;
              IF (v[ ] == START_SUB_PH)THEN
                     line_decode = _sub_ph;
              ENDIF;
        WHEN _sub_ph              =>
              csync_ff.j    =      ((h[ ] == CSYNC_SUB_PH_J) & !line_ff & !field_ff)
                            #      ((h[ ] == CSYNC_SUB_PH_J) & !line_ff & field_ff);
              csync_ff.k    =      ((h[ ] == CSYNC_SUB_PH_K) & !line_ff & !field_ff)
                            #      ((h[ ] == CSYNC_SUB_PH_K) & !line_ff & field_ff);
---           hd_ff.j       =      ((h[ ] == HD_J) & !line_ff& !field_ff)
---                         #      ((h[ ] == HD_J) & !line_ff & field_ff);
---           hd_ff.k       =      ((h[ ] == HD_K) & !line_ff & !field_ff)
---                         #      ((h[ ] == HD_K) & !line_ff & field_ff);
---           vd_ff.j       =      VCC;
---           fld_ff.j      =      VCC;
---           burst_ff.j    =      ((h[ ] == BURST_J) & !line_ff & !field_ff)
---                         #      ((h[ ] == BURST_J) & !line_ff & field_ff);
---           burst_ff.k    =      ((h[ ] == BURST_K) & !line_ff & !field_ff)
---                         #      ((h[ ] == BURST_K) & !line_ff & field_ff);
              blank_ff.k    =      VCC;
              IF (v[ ] == START_VID_ACT) THEN
                     line_decode =_vid_act;
              END IF;
        WHEN _vid_act             =>
              csync_ff.j    =      ((h[ ] == CSYNC_VID_ACT_J) & !line_ff & !field_ff)
                            #      ((h[ ] == CSYNC_VID_ACT_J) & !line_ff & field_ff);
              csync_ff.k    =      ((h[ ] == CSYNC_VID_ACT_K) & !!line_ff & !field_ff)
                            #      ((h[ ] == CSYNC_VID_ACT_K) & !line_ff & field_ff);
---           hd_ff.j       =      ((h[ ] ==HD_J) & !line_ff & !field_ff)
---                         #      ((h[ ] == HD_J) & !line_ff & field_ff);
---           hd_ff.k       =      ((h[ ] ==HD_K) & !line_ff & !field_ff)
---                         #      ((h[ ] == HD_K) & !line_ff & field_ff);
---           vd_ff.j       =      VCC;
---           fld_ff.j      =      VCC;
---           burst_ff.j    =      ((h[ ] == BURST_J) & !line_ff & !field_ff)
---                         #      ((h[ ] == BURST_J) & !line_ff & field_ff);
---           burst_ff.k    =      ((h[ ] == BURST_K) & !line_ff & !field_ff)
---                         #      ((h[ ] == BURST_K) & !line_ff & field_ff);
              blank_ff.j    =      ((h[ ] == BLANK_J) & !line_ff & !field_ff)
                            #      ((h[ ] == BLANK_J) & !line_ff & field_ff);
              blank_ff.k    =      ((h[ ] == BLANK_K) & !line_ff & !field_ff)
                            #      ((h[ ] == BLANK_K) & !line_ff & field_ff)
                            #      (v[ ] == START_PRE_EQ);
--                          #      ((v[ ] == ONE_LINE_LEFT) & !field_ff);
              IF(v[ ] == START_PRE_EQ)THEN
                     line_decode =_pre_eq;
              END IF;
        END CASE;
%
        Establish the output connections
%
        csync                 =     csync_ff;
```

-continued

```
---    hd              =       hd_ff;
       vd              =       vd_ff;
---    fld             =       fld_ff;
---    burst           =       burst_ff;
       blank           =       blank_ff & csync_ff; % low true blank_ff & csync_ff %
%
Equations for line_ff and field_ff. When the horizontal counter is in the first half of the scanline the
line_ff output will be low. A high indicates that the counter is in the second half of the scanline.
To make an efficient circuit the vertical counter uses line_ff as the terminal bit. The field_ff is use
to track the current field. During odd files (1st physical field) the field_ff output will be low. During
even fields it will be high.
%
       line_ff         =       (h[ ] == HCNT_ROLL_OVER);
       field_ff        =       (v[ ] == VCNT_ROLL_OVER & h[ ] == HCNT_ROLL_OVER);
%
GREYCODE equations. Each bit toggles when previous bits are 10..0 and the odd bit is 1.
%
       IF(!field_ff) THEN
         v[ ] =        (((v[ ], line_ff) == B"X1000000001") & !vcnt_reset # vcnt_reset & v9,
                       ((v[ ], line_ff) == B"XX100000001") & !vcnt_reset # vcnt_reset & v8,
                       ((v[ ], line_ff) == B"XXX10000001") & !vcnt_reset # vcnt_reset & v7,
                       ((v[ ], line_ff) == B"XXXX1000001") & !vcnt_reset # vcnt_reset & v6,
                       ((v[ ], line_ff) == B"XXXXX100001") & !vcnt_reset # vcnt_reset & v5,
                       ((v[ ], line_ff) == B"XXXXXX10001") & !vcnt_reset # vcnt_reset & v4,
                       ((v[ ], line_ff) == B"XXXXXXX1001") & !vcnt_reset # vcnt_reset & v3,
                       ((v[ ], line_ff) == B"XXXXXXXX101") & !vcnt_reset # vcnt_reset & v2,
                       ((v[ ], line_ff) == B"XXXXXXXXX11") & !vcnt_reset # vcnt_reset & v1,
                       ((v[ ], line_ff) == B"XXXXXXXXXX0") & !vcnt_reset # vcnt_reset & v0
                       )
                       & (h[ ] == HCNT_ROLL_OVER);
       ELSE
         v[]] =        (((v[ ], !line_ff) == B"X1000000001") & !vcnt_reset # vcnt_reset & v9,
                       ((v[ ], !line_ff) == B"XX100000001") & !vcnt_reset # vcnt_reset & v8,
                       ((v[ ], !line_ff) == B"XXX10000001") & !vcnt_reset # vcnt_reset & v7,
                       ((v[ ], !line_ff) == B"XXXX1000001") & !vcnt_reset # vcnt_reset & v6,
                       ((v[ ], !line_ff) == B"XXXXX100001") & !vcnt_reset # vcnt_reset & v5,
                       ((v[ ], !line_ff) == B"XXXXXX10001") & !vcnt_reset # vcnt_reset & v4,
                       ((v[ ], !line_ff) == B"XXXXXXX1001") & !vcnt_reset # vcnt_reset & v3,
                       ((v[ ], !line_ff) == B"XXXXXXXX101") & !vcnt_reset # vcnt_reset & v2,
                       ((v[ ], !line_ff) == B"XXXXXXXXX11") & !vcnt_reset # vcnt_reset & v1,
                       ((v[ ], !line_ff) == B"XXXXXXXXXX0") & !vcnt_reset # vcnt_reset & v0
                       )
                       & (h[ ] == HCNT_ROLL_OVER),
       END IF;
       vcnt_reset = (v[ ] == VCNT_ROLL_OVER # cnt_reset);
       h_odd = h_odd # !pwr_up;
       h[ ] =          (((h[ ], h_odd) == B"X1000000001") & !hcnt_reset # hcnt_reset & h9,
                       ((h[ ], h_odd) == B"XX100000001") & !hcnt_reset # hcnt_reset & h8,
                       ((h[ ], h_odd) == B"XXX10000001") & !hcnt_reset # hcnt_reset & h7,
                       ((h[ ], h_odd) == B"XXXX1000001") & !hcnt_reset # hcnt_reset & h6,
                       ((h[ ], h_odd) == B"XXXXX100001") & !hcnt_reset # hcnt_reset & h5,
                       ((h[ ], h_odd) == B"XXXXXX10001") & !hcnt_reset # hcnt_reset & h4,
                       ((h[ ], h_odd) == B"XXXXXXX1001") & !hcnt_reset # hcnt_reset & h3,
                       ((h[ ], h_odd) == B"XXXXXXXX101") & !hcnt_reset # hcnt_reset & h2,
                       ((h[ ], h_odd) == B"XXXXXXXXX11") & !hcnt_reset # hcnt_reset & h1,
                       ((h[ ], h_odd) == B"XXXXXXXXXX0") & !hcnt_reset # hcnt_reset & h0
       hcnt_reset = (h[ ] == HCNT_ROLL_OVER) # pwr_up # cnt_reset;
SM_dvsv100.reset = grst;
pin_do5 = do5_bit & csync;              -- output goes to 0 during csync
pin_do6 = do6_bit & csync;              -- otherwise tracks the state machine
pin_do7 = do7_bit & csync;
SM_dvsv100.clk = ck25;
CASE (SM_dvsv100) IS
    WHEN two =>                         -- state two -- blanking
        IF (blank) THEN                 -- blank is low true, when high . . .
            SM_dvsv100 = three;         -- . . . to state 3 (rest)
        ELSE
            SM_dvsv100 = two;           -- . . . otherwise hold here.
        END IF;
    WHEN three =>
        IF (data00) THEN                -- from three, 00 maps to four
            SM_dvsv100 = four;
        ELSIF (data01) THEN             --    . . . 01 maps to five
            SM_dvsv100 = five;
        ELSIF (data10) THEN             --  . . . 10 maps to six
            SM_dvsv100 = six;
        ELSIF (data11) THEN             --  . . . 11 maps to seven
            SM_dvsv100 = seven;
        ELSIF (!blank) THEN             -- when blanking goes low go to . . .
```

```
                SM_dvsv100 = two;              -- ... state 2
            ELSE
                SM_dvsv100 = three;            -- hold in three if no events
            END IF;
        WHEN four =>
            IF (data00) THEN                   -- from four, 00 maps to three
                SM_dvsv100 = three;
            ELSIF (data01) THEN                -- ... 01 maps to five
                SM_dvsv100 = five;
            ELSIF (data10) THEN                -- ... 10 maps to six
                SM_dvsv100 = six;
            ELSIF (data11) THEN                -- ... 11 maps to seven
                SM_dvsv100 = seven;
            ELSIF (dataend) THEN               -- dataend returns to three
                SM_dvsv100 = three;
            ELSE
                SM_dvsv100 = four;             -- hold in four if no events
            END IF;
        WHEN five =>
            IF (data00) THEN                   -- from five, 00 maps to three
                SM_dvsv100 = three;
            ELSIF (data01) THEN                -- ... 01 maps to four
                SM_dvsv100 = four;
            ELSIF (data10) THEN                -- ... 10 maps to six
                SM_dvsv100 = six;
            ELSIF (data11) THEN                    ... 11 maps to seven
                SM_dvsv100 = seven;
            ELSIF (dataend) THEN               -- dataend returns to three
                SM_dvsv100 = three;
            ELSE
                SM_dvsv100 = five;             -- hold in five if no events
            END IF;
        WHEN six =>
            IF (data00) THEN                   -- from six, 00 maps to three
                SM_dvsv100 = three;
            ELSIF (data01) THEN                -- ... 01 maps to four
                SM_dvsv100 = four;
            ELSIF (data10) THEN                -- ... 10 maps to five
                SM_dvsv100 = five;
            ELSIF (data11) THEN                -- ... 11 maps to seven
                SM_dvsv100 = seven;
            ELSIF (dataend) THEN               -- dataend returns to three
                SM_dvsv100 = three;
            ELSE
                SM_dvsv100 = six;              -- hold in six if no events
            END IF;
        WHEN seven =>
            IF (data00) THEN                   -- from seven, 00 maps to three
                SM_dvsv100 = three;
            ELSIF (data01) THEN                -- ... 01 maps to four
                SM_dvsv100 = four;
            ELSIF (data10) THEN                -- ... 10 maps to five
                SM_dvsv100 = five;
            ELSIF (data11) THEN                -- ... 11 maps to six
                SM_dvsv100 = six;
            ELSIF (dataend) THEN               -- dataend returns to three
                SM_dvsv100 = three;
            ELSE
                SM_dvsv100 = seven;            -- hold in seven if no events
            END IF;
        WHEN OTHERS =>
            IF (VCC) THEN
                SM_dvsv100 = two;              -- catch all for initialization
            END IF;
END CASE;
dack_in = VCC;                                 -- not presently used
irq_pin = VCC;                                     -- not presently used
r02be =     !a11 & !a10 & a9 & !a8 &
            a7 & !a6 & a5 & a4 &
            a3 & a2 & a1 & a0 & !iow & !aen ;  -- read from 02beh
w02bf =     !a11 & !a10 & a9 & !a8 &
            a7 & !a6 & a5 & a4 &
            a3 & a2 & a1 & a0 & !iow & !aen;   -- write to 02bfh
d[7..0] = tri_d[7..0].out;
tri_d[7..0].oe        = r02be;
tri_d[7..0].in        = (hf,blank,eorf,pafe,vd,0,0,0);  -- data during read
sw[7..0].clk          = ck25;
sw[7..0].d            = d[7..0];               -- data during write
cnt[ ].clk = ck25;
```

-continued

```
if !blank then                                    -- while in blanking, cnt[ ]=0
  cnt[11..9] = 0;
else
  if cnt[3..0]==9 then                            -- low 4 bits are decade counter
    cnt[3..0]= 0;
    if cnt[11..4]!=132 then                       -- high 8 bits max out at 132
      cnt[11..4] = cnt[11..4] +1;
    else
      cnt[11..4] = 132;
    end if;
  else
    if cnt[11..4]!=132 then
      cnt[3..0] = cnt[3..0]+1;
      cnt[11..4] = cnt[11..4];
    else
      cnt[11..0] = cnt[11..0];
    end if;
  end if;
end if;
fr.clk = ck25;
if blank & eorf & (cnt[11..6]!=33) & (cnt[5..0]==0) &
  !((v[ ] == VCNT_HALF_LINE2) & !field_ff) &     -- prevent data during
  !((v[ ] == VCNT_HALF_LINE) then                -- half lines in field
    fr = GND;                                    -- initiate frame signal
end if;
symc[5..0].clk = ck25;
dataend.clk = ck25;
dataend1.clk = ck25;
if(!blank # !eorf) & (cnt[5..0]==0) then         -- if sync or no data
    dataend1 = VCC;                              -- end frame signal
end if;
dataend = dataend1;                              -- 1 clock delayed
if !fr # (symc[ ] !=0) then                      -- count symbols
  if symc[3..0]==9 then                          -- low 4 are decade
    symc[3..0]= 0;
    symc[5..4]= symc[5..4]+1;                    -- high 2 are bit pair
  else
    symc[3..0] = symc[3..0]+1;
    symc[5..4] = symc[5..4];
  end if;
else
  symc[5..0] =0;
end if;
valid.clk      = ck25;
valid.d = !fr # ((symc[5..4]!=0) & (symc[3..0]==0));   -- sync states
pin_do[4..0]   =     (0,0,0,0,0);                -- low 5 A/D bits
pin_do[7..5].clk   =ck25;
data00 =    !symc5 & !symc4 & !f1 & !f0 & valid #   -- 00 in 1st pair
            !symc5 &  symc4 & !f3 & !f2 & valid #   -- 00 in 2nd pair
             symc5 & !symc4 & !f5 & !f4 & valid #   -- 00 in 3rd pair
             symc5 &  symc4 & !f7 & !f6 & valid;    -- 00 in 4th pair
data01 =    !symc5 & !symc4 & !f1 &  f0 & valid #   -- 01 in 1st pair
            !symc5 &  symc4 & !f3 &  f2 & valid #   -- 01 in 2nd pair
             symc5 & !symc4 & !f5 &  f4 & valid #   -- 01 in 3rd pair
             symc5 &  symc4 & !f7 &  f6 & valid;    -- 01 in 4th pair
data10 =    !symc5 & !symc4 &  f1 & !f0 & valid #   -- 10 in 1st pair
            !symc5 &  symc4 &  f3 & !f2 & valid #   -- 10 in 2nd pair
             symc5 & !symc4 &  f5 & !f4 & valid #   -- 10 in 3rd pair
             symc5 &  symc4 &  f7 & !f6 & valid;    -- 10 in 4th pair
data11 =    !symc5 & !symc4 &  f1 &  f0 valid #     -- 11 in 1st pair
            !symc5 &  symc4 &  f3 &  f2 & valid #   -- 11 in 2nd pair
             symc5 &!symc4 &  f5 &  f4 & valid #    -- 11 in 3rd pair
             symc5 &  symc4 &  f7 &  f6 & valid;    -- 11 in 4th pair
END;
```

The steps for programming the EPLD to generate digital representations of these NTSC waveform signals is well known to those skilled in the art, and thus will not be described in further detail herein. For further details regarding the programming of the EPLD to carry out the first set of operations reference is made to the Application Notes available from Altera Corporation, which are incorporated herein by reference.

In a preferred embodiment of the present invention oscillators 204 provides a master clock signal to control unit 220 at a frequency of 25.175 Mhz. This provides a faster data transfer rate than the typical NTSC clocking frequency of 14.318 Mhz, while still complying with the NTSC standard. Since the master clock frequency is 25.175 Mhz and the active video period is 52.433 μsec per line, there are 1320 clock pulses per line. The EPLD is programmed to have a pair of counters. The first counter is a 12 bit counter, where the 4 lowest bits form a decade counter. Accordingly, the first counter counts 10 clock pulses 132 times (for a total of 1320 clock pulses). On every 10th clock pulse a transition occurs. 132 transitions occur for each horizontal line. When the first counter reaches a full count of 1320, the first counter will hold while waiting for the horizontal blanking interval to finish. Because there are 132 transitions per line, 132 different output levels can be encoded on each line. Moreover, since the active video period is 52.433 μsec per line, the period of each transition is 0.3972 μsec.

The second counter is a 6 bit counter, where the 4 lowest bits form a decade counter. Accordingly, the second counter counts 10 clock pulses 4 times (for a total of 40 clock pulses). Since a transition occurs every 10 clock pulses, a new pair of bits is encoded to an output level every 10 clock pulses. As a result, every 40 clock pulses indicates the encoding of 8 bits (1 byte) of data.

Referring again to FIG. 14A, control unit 220 (EPLD) is programmed to operate as a state machine to generate the appropriate signals for the horizontal blanking interval and for encoding the data bits. In this regard, the state machine has states 7, 6, 5, 4, 3, and 2. The highest three bits of the digital encoded data (i.e., the MSB digital encoded data), is determined by "ANDing" the state with a csync output, which is low (i.e., "zero") during the horizontal synchronizing pulse. As a result, state machine "state 2" generates an MSB digital encoded data output of 2 for horizontal blanking, and an MSB digital encoded data output of 0 for horizontal synchronizing. State machine states 3 through state 7 generates a respective MSB digital encoded data output of 3 through 7. As indicated above, the digital encoded data (8 bits) is fed as an input to D/A converter 206. The output of D/A converter 206 is transmitted to receiver/decoder 302 via communications medium 190.

It should be appreciated that the state machine is suitably modified to have a different state corresponding to each and every type of encoded output information, rather than have state 2 correspond to both horizontal blanking and horizontal synchronizing. Moreover, it should be noted that state 3 (which generates an MSB digit encoded data output of 3) also corresponds to an idle condition, wherein the transfer of data has been paused.

Figure 15B:
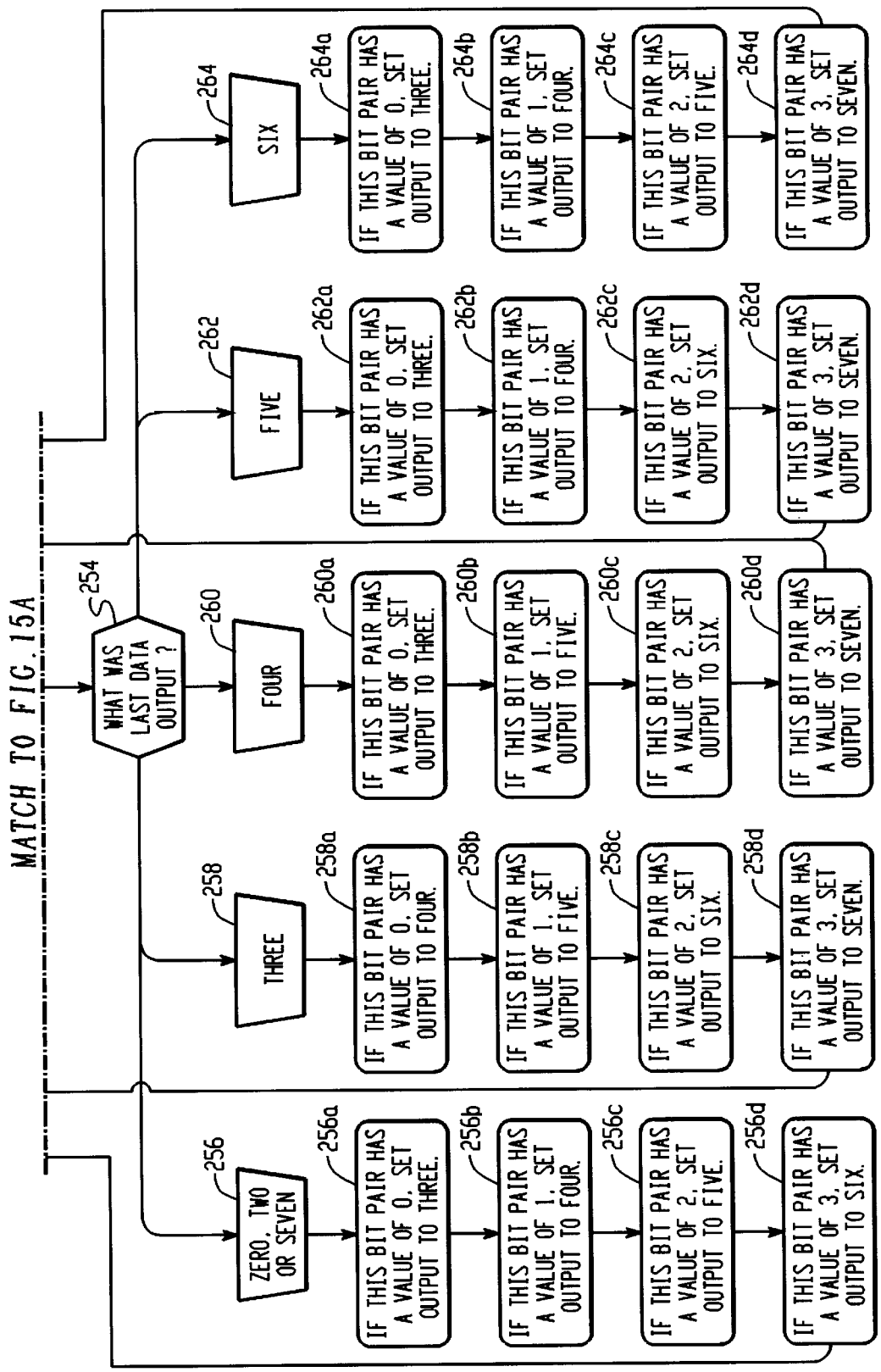

Referring now to FIGS. 15A and 15B, there is shown a flow diagram 230 illustrating the EPLD control unit logic for encoding data. Flow diagram 230 describes the operations of the state machine in EPLD control unit 220 for encoding data. It should be kept in mind that the EPLD performs multiple logic operations simultaneously, and thus the flow diagram should not be interpreted as defining a series sequential operations, but rather as an aid to understanding the underlying logic operations performed by the EPLD.

Beginning with step 232, the encoding operations start by continuously generating the digital encoded data for the first four phases of the NTSC waveform (including vertical blanking pulses, vertical synchronizing pulses and equalizing pulses), as described above. Next, the raw data is sent to FIFO 208 (step 234). The term "raw data" refers to uncoded data, which in the illustrated embodiment is a bit pair. If it is time for a horizontal sync pulse the MSB digital encoded data is set to zero (step 238). If it is not time for a horizontal synchronizing pulse, we determine if we are in a horizontal blanking interval or approaching a horizontal blanking interval (step 240), If it is time for a horizontal blanking pulse the MSB digit encoded data is set to two (step 242). If it is not time for a horizontal blanking interval, then we are ready to encode "raw data." If the FIFO is empty (step 244), the MSB digital encoded data output remains unchanged (step 246), whereas if the FIFO is not empty, a byte of raw data is read from the FIFO for encoding (step 248). For each pair of bits in the 8-bit raw data byte it is determined what was the last MSB digital encoded data output (steps 250 and 254). Depending upon the last MSB digital encoded data output, one of steps 256, 258, 260, 262 or 264 is followed. The encoding of the current raw data bit pair is then performed by evaluating the bit pair with the logic of steps 256a–256d, 258a–258d, 260a–260d, 262a–262d, or 264a–264d. It should be appreciated that this encoding scheme is the same as encoding scheme described in detail above. Once a complete 8 bit raw data byte has been encoded the logic continues to step 252.

The foregoing system for encoding the raw data provides a substantially high data transfer rate. As discussed above, the NTSC television signal waveform has a scanning rate of 15,750 lines per second. Accordingly, there are 63.55 μsec per line. At a clock speed of 25.175 Mhz, there are 1600 clock pulses (i.e., counts) per line. Only 1320 clock pulses are available for transferring data, when accounting for the horizontal blanking interval. 2 bits of raw data are encoded every 10 clock pulses, therefore 264 bits (i.e., 33 bytes) of raw data are encoded every scan line. As indicated above, there are 241.5 scan lines available per field, for transferring raw data (accounting for the vertical blanking period). Accordingly, 483 scan lines are available per frame for transferring raw data. It then follows that there are 15,939 bytes per frame and 478,170 bytes per second (i.e., 3,825,360 bits per second) It should be appreciated that the data transfer rate can be further increased by modifying the clock speed and/or encoding the raw data into a greater number of levels, as discussed above.

Figure 16A:
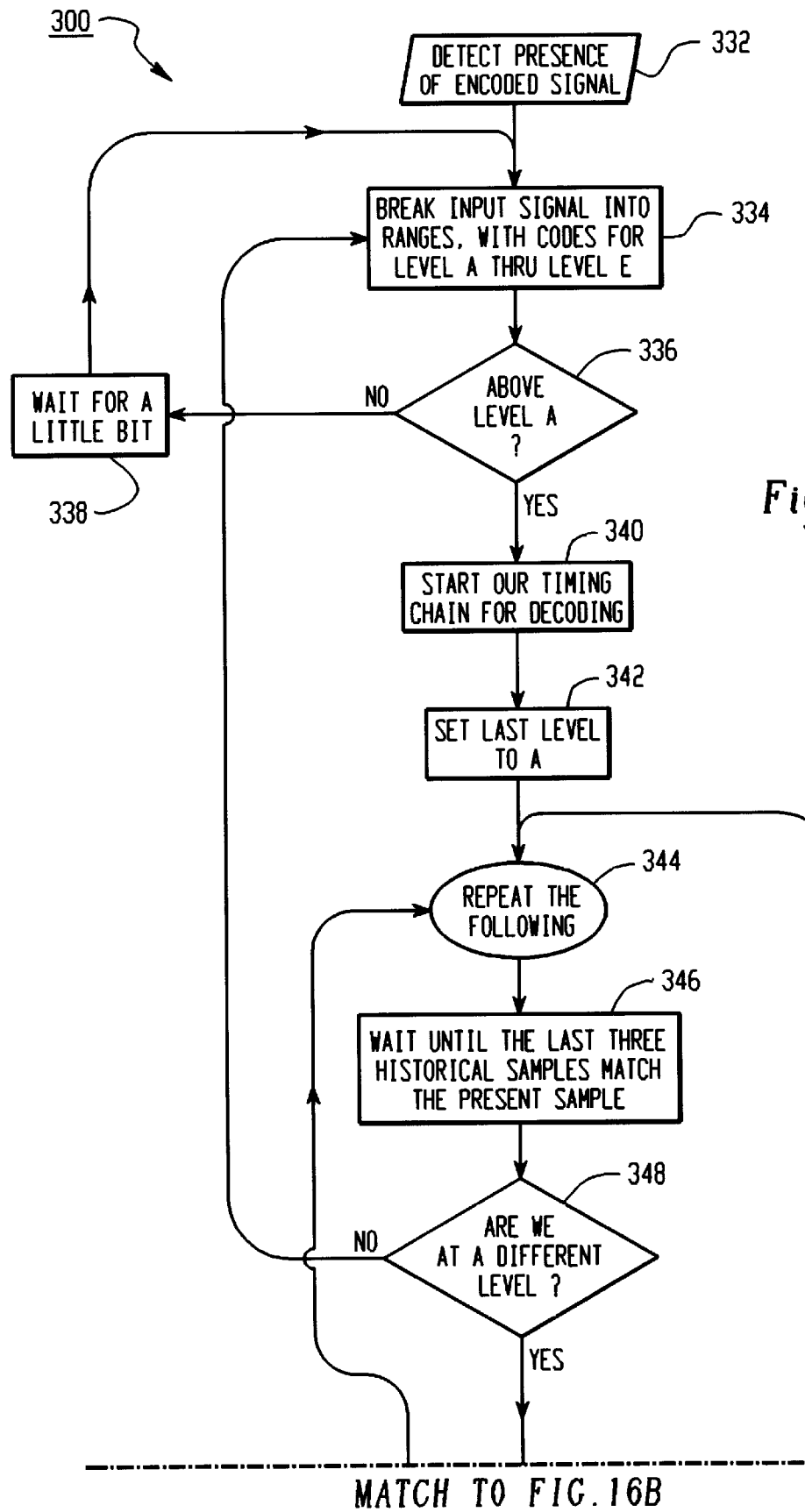
FIGS. 16A and 16B provide a diagram illustrating the control unit logic for decoding data.
Figure 16B:
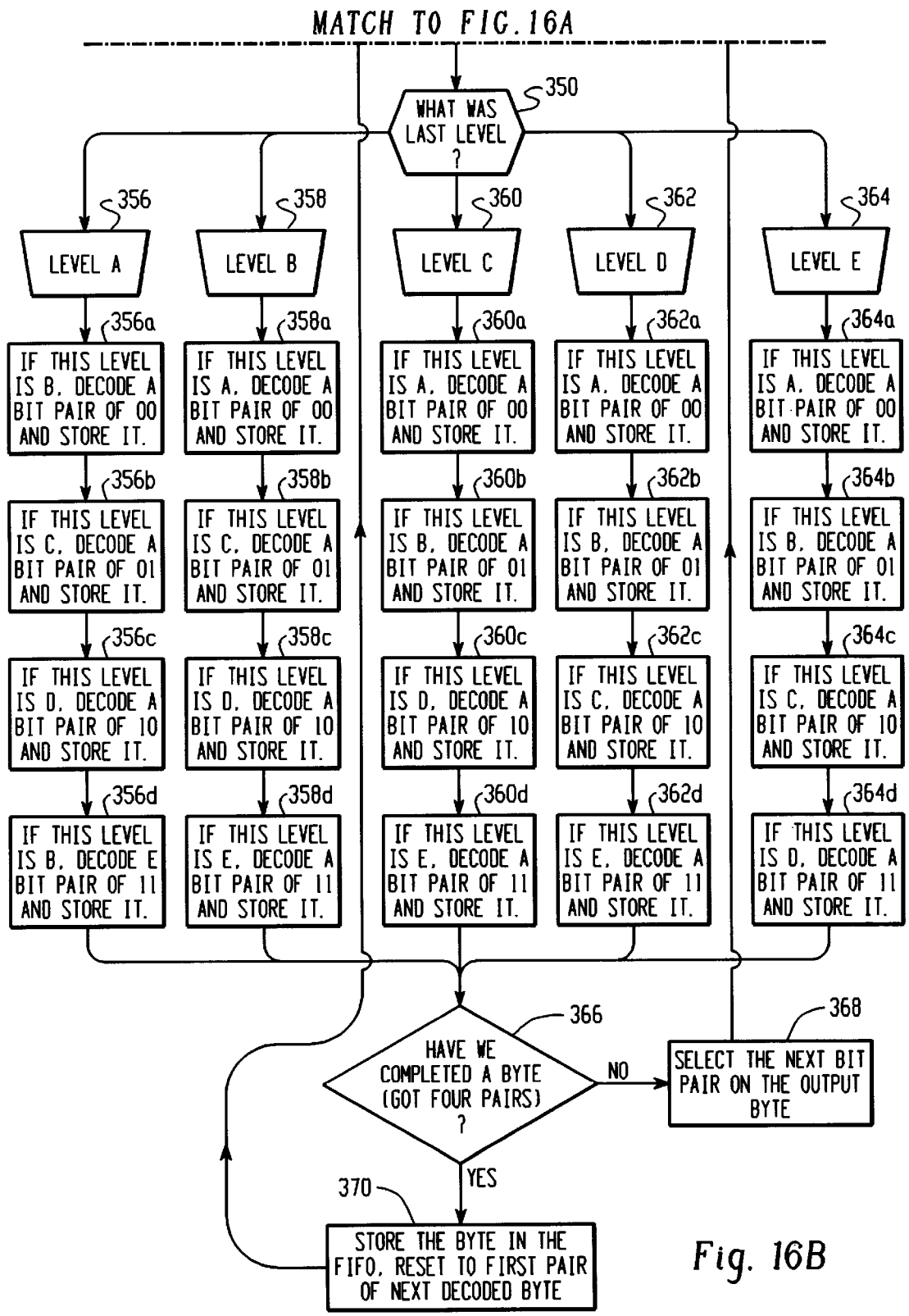

The decoding operations performed by EPLD control unit 320 of receiver/decoder 302 will now be described in detail with reference to FIGS. 16A–19. FIGS. 16A and 16B show a flow diagram 330 which illustrates the logic of the decoding operations performed by EPLD control unit 320. First, the presence of an encoded signal is detected (step 332). In this regard, AID converter 306 converts analog encoded data to digital encoded input data. Next, it is determined what level the digital encoded input data is in. The evaluation of ranges is necessary due to noise, interference and converter tolerances, which effect the conversion of analog encoded data back to the original digital encoded data output by the transmitter/encoder 202. The range into which the digital encoded input data falls is used to determine the state of the encoder EPLD control unit 220 and the corresponding encoded input information. Each digital encoded input data range has a corresponding input pattern and encoded input information level.

If the digital encoded input data is at a level indicative of a vertical blanking interval or horizontal blanking interval, there is no data to decode (steps 336 and 338). In this regard, the data received by receiver/decoder 302 is ignored, since the signal corresponding to the vertical and horizontal blanking interval are generated merely to comply with the NTSC standard.

If the digital encoded input data is at a level above the level corresponding to the vertical and horizontal blanking intervals, then a decoding procedure is initiated. In this regard, counters are set for decoding, and the "last level" is set to A (steps 336, 340 and 342). The counters are used to sample consecutive encoded digital input data and establish a stable value. To this end, previous and current digital encoded input data samples are averaged and stored (step 346). The ranges of the last four averages are compared, and if the ranges are all the same and correspond to a level different from the level of the last set of four matches (step 348), then a four-bit counter is preset to 16. The counter is then subsequently decremented, while more comparisons are performed. When the counter has decremented to 12, it is determined that the input data has stabilized. This acceptable digital encoded input data is decoded according to steps 350–366. The decoding logic is repeated (step 368) to decode the bit pairs. Once a byte of data has been decoded, the byte is stored in the FIFO (step 370). It should be appreciated that the decoding scheme implemented in FIGS. 16A and 16B are the same as the decoding scheme described in detail above. It should be noted that step 348 determines a change in the digital encoded input data has occurred. Where no change occurs, no new encoded data has been received for decoding.

Referring now to FIG. 17, TABLE 2 shows the correspondence between the original digital encoded data, the encoded input information, the encoder state, the digital encoded input data range, and the input pattern.

It should be appreciated that A/ID converter 306 includes an automatic gain control circuit (AGC) in order properly convert (i.e., scale) the input analog data levels to the appropriate digital input data values. In this regard, A/D converter 306 receives gate A and gate B pulses from control unit 320. The decoded horizontal synchronizing pulse and horizontal blanking pulse are used by the AGC. In particular, the synchronizing pulse is used to set a zero reference, while the blanking pulse (following the synchronizing pulse) is used to adjust the gain. The foregoing procedure for setting the AGC is well known to those skilled in the art, and therefore will not be described in further detail herein.

The control logic of the decoder control unit will now be described in further detail with reference to the EPLD program code listing set forth below:

---

SECTION 1.

---

```
--CONSTANT L0=48;
levels
CONSTANT L2=116;
CONSTANT L3=150;
CONSTANT L4=184;
CONSTANT L5=218;
CONSTANT L6=255;
--Definitions, defaults, variables, global clock and reset signals.
SUBDESIGN dvsv2b
(
unused)
a[11..0]: INPUT;                    -- Low 12 address lines
--irq_pin : OUTPUT;                 -- irq/dreq/dack: implement later
--dreq_pin : INPUT;
--dack_pin : OUTPUT;
sm0_pin : OUTPUT;                   -- State machine output pins (debug)
sm1_pin : OUTPUT
sm2_pin : OUTPUT;
aen: INPUT;                         -- address enable
ior: INPUT;                         -- I/O read signal
iow: INPUT;                         -- I/O write signal
d[7..0] : BIDIR;                    -- data bus
pafe: INPUT;                        -- FIFO full flag
eorf : INPUT;                       -- FIFO empty flag
hf : INPUT;                         -- FIFO half full flag
ad[7..0] : INPUT;                   -- DAC input (analog data in)
sw[7..0] : OUTPUT;                  -- FIFO write pins (FIFO input port)
f[7 0] : INPUT;                     -- FIFO read pins (FIFO output port)
ck25 : INPUT;                       -- 25.175Mhz master system clock
reset : INPUT;                      -- reset from PCBUS
circuit
circuit
fifo_w : OUTPUT;                    -- FIFO write signal
r02bf : OUTPUT;                     -- read signal from 02bd (it was 02bf)
                                    -- needs global change
tieback1 : INPUT;                   -- loopback if using EPM7096 part
tieback2 : OUTPUT;
)
VARIABLE
fifo_r : SOFT;                      -- fifo read signal
a/b)
r02bc : SOFT;                       -- read FIFO status signal
w02bc : SOFT;                       -- write (used to go into RAW mode)
d[7..0] : NODE;                     -- Data bus inputs
tri_d[7..0] : TRI;                  -- Data bus tristate output
symto[3..0] : dffe;                 -- Symbol timeout counter
cnt[11..0] : dffe;                  -- counter for blanking timeout
in[2..0] : dffe;                        -- input code 000 thru 100 (binary)
ind[2..0] : dffe;                       -- delayed code 000 thru 100 (binary)
res[1..0] : dffe;                       -- result bit pair 00 thru 11 (binary)
ala[7..3] : dffe;                   -- Above level 3-7 pipeline stage A
alb[7..3] : dffe;                   -- Above level 3-7 pipeline stage B
alc[7..3] : dffe;                   -- Above level 3-7 pipeline stage C
ald[7..3] : dffe;                   -- Above level 3-7 pipeline stage D
raw_mode: dffe;                     -- raw mode flag
raw_cnt[1..0] : dffe;               -- counter until we exit raw mode
al0 : dffe;                         -- Above level 0 (not sync)
```

-continued

```
al1 : dffe;                          -- Above level 1 (not blanking)
sw[7..0]: dffe;                      -- FIFO write bits
grst : NODE;                         -- Global reset node
gclk : NODE;                         -- global clock node
gatea : jkffe;                       -- gate a to DAC for AGC
gateb : jkffe;                       -- gate b to DAC (see DAC app notes)
nad[7..0] : dffe;                    -- delayed ad input
nnad[8..0] : dffe;                   -- average of AD and AND (filter)
strobe : dffe;                       -- strobe data write
strobe1 : dffe;                      -- delayed strobe date write
SM_dvsv200: MACHINE
    OF BITS (sm[7..0])
       WITH STATES (zero, one, two, three, four, five, six, seven);
BEGIN
DEFAULTS
  sw0.clk = VCC;                     -- no data by default
  sw1.dk = VCC;
  sw2.clk = VCC
  sw3.clk = VCC;
  sw4.clk = VCC;
  sw5.clk = VCC;
  sw6.clk = VCC;
  sw7.clk = VCC;
  fifo_w = VCC;                      -- wait for write to be sensible
  blnk.j = GND;                      -- manage blanking signal
  blnk.k = GND;
  gatea.j = GND;                     -- control gatea/b signals
  gatea.k = GND
  gateb.j = GND;
  gateb.k = GND;
  raw_mode.clrn = VCC;               -- leave raw mode alone
END DEFAULTS;
  gclk = GLOBAL(ck25);               -- global clock
  grst = !reset;                     -- global low-true reset signal
-- fifo_w.clk = gclk;
  tieback2 = tieback1 & GND;            -- keep the pins occupied
tic
  SM_dvsv200.clk = gclk;             -- State machine is syncronous
  SM_dvsv200.reset = grst;           -- and reset on power up
happy
  sm1_pin = GND;
  sm2_pin = GND;
```

SECTION 2.

```
-- if we're in raw mode, SW should track AD so that we write raw data to FIFO
-- otherwise we pair 'em up, cause we send a pair of bits at a time.
  sw0.d = res0 & !raw_mode # ad0 & raw_mode;
  sw1.d = res1 & !raw_mode # ad1 & raw_mode;
  sw2.d = res0 & !raw_mode # ad2 & raw_mode;
  sw3.d = res1 & !raw_mode # ad3 & raw_mode;
  sw4.d = res0 & !raw_mode # ad4 & raw_mode;
  sw5.d = res1 & !raw_mode # ad5 & raw_mode;
  sw6.d = res0 & !raw_mode # ad6 & raw_mode;
  sw7.d = res1 & !raw_mode # ad7 & raw_mode;
```

SECTION 3.

```
-- when symto[3..0] gets down to 12, the state machine clocks the
-- current res1/res0 pair into the appropriate output pair based on the
-- state of the machine (sw7/sw6, sw5/sw4, sw3/sw2, sw1/sw0), and then
-- trips to the next state. If, within states 3, 4, or 5, symto[3..0]
-- gets down to 0, we reset the state machine to state 2. Once we've hit
-- state 6, we have a valid byte ready to write to the fifo, so on the next
-- tick we will signal the fifo_w line, and then reset the machine to state 2.
-- Raw mode is unimportant to normal operation.
  CASE (SM_dvsv200) IS
one
  IF !raw_mode THEN
    SM_dvsv200 = two;
  ELSE
    raw_cnt[ ] = 0;
    SM_dvsv200 = one;
  END IF;
2
 sw[7..0]= ad[7..0];
 sw[7..0].clk = gclk;
 fifo_w = gclk;                      -- count counts & write data
  IF !blnk & cnt[11..0]==0 THEN
```

```
        raw_cnt[ ] = raw_cnt[ ] + 1;        -- when we're out of counts
        IF raw_cnt[ ]==3 THEN
            raw_mode.clrn = GND;            - reset raw mode
        END IF;
    END IF;
    IF !raw_modeTHEN
        SM_dvsv200 two;                     -- when done, resume decode
    ELSE
        SM_dvsv200 = one;
    END IF;
```

SECTION 4.

```
    WHEN two =>
        IF (symto[3..0]==12) THEN           -- if we get to 12, good data
            sw0.clk = GND;                  -- clock in bits 0 & 1
            sw1.clk = GND;
            SM_dvsv200 = three;             -- go to state three
mode
            SM_dvsv200 = zero;
        ELSE
otherwise
        END IF;
    WHEN three =>
        IF (symto[3..0]==12) THEN           -- if we get to 12, good data
            sw2.clk = GND;                  -- clock in bits 2 & 3
            sw3.clk = GND;
            SM_dvsv200 = four;              -- go to state four
        ELSIF symto[3..0]!=0 THEN           -- if no timeout
            SM_dvsv200 = three;             -- hold current state
        ELSE
two
        END IF;
    WHEN four =>
        IF (symto[3..0]==12) THEN           -- if we get to 12, good data
            sw4.clk = GND;                  -- clock in bits 4 & 5
            sw5.clk = GND;
            SM_dvsv200 = five;              -- go to state five
        ELSIF symto[3..0]!=0 THEN           -- if no timeout
            SM_dvsv200 = four;              -- hold current state
        ELSE
two
        END IF;
    WHEN five =>
        IF (symto[3..0]==12) THEN           -- if we get to 12, good data
            sw6.clk = GND;                  -- clock in bits 6 & 7
            sw7.clk = GND;
            SM_dvsv200 = six;               -- go to state six
        ELSIF symto [3..0]!=0 THEN          -- if no timeout
            SM_dvsv200 = five;              -- hold current state
        ELSE
two
        END IF;
    WHEN six =>
        IF (VCC) THEN
            SM_dvsv200 = seven;             -- go to state seven
        END IF;
    WHEN seven =>
        IF (VCC) THEN
            fifo_w = GND;                   -- generate write pulse
            SM_dvsv200 = two;               -- go to state two
        END IF;
END CASE;
```

SECTION 5.

```
-- When strobe 1 goes low, we set symto [3..0] counter to 14. On each
-- successive clock, it counts down 1 count, toward 0.
strobe1
    symto[3..0]= 14;
elsif symto[3..0]!=0 then                   -- if time left, count down
    symto[3..0] = symto[3..0]-1;
else
    symto[3..0]= 0;                         -- hold at 0 until stribe1
end if;
```

SECTION 6.

-- Here are address decodes for fifo_r r02bc and w02bc, to give access

-continued

-- to this device within the PC address space.
r02bc.in = !a11 & !a10 & a9 & !a8 &
  a7 & !a8 & a5 & a4 &
  a3 & a2 & !a1 & !a0 & !ior & !aen;
w02bc.in =!a11 & !a10 & a9 & !a8 &
  a7 & !a6 & a5 & a4 &
  a3 & a2 & !a1 & !a0 & !iow & !aen;
fifo_r = !a11 & !a10 & a9 & !a8 &
  a7 & !a6 & a5 & a4 &
  a3 & a2 & !a1 & a0 & !ior & !aen;
r02bf = !fifo_r;

SECTION 7.

-- Raw mode is unimportant to normal operation.
raw_mode.clk = gclk;    -- handle raw mode
raw_cnt[ ].clk = gclk;
raw_mode = d7;
raw_mode.ena = w02bc;

SECTION 8.

-- On a sample by sample basis (at 25.175Mhz), compute the sum of the
-- current analog input ad[7..0] and the previous analog input nad[7..0]
-- and put the result into nnad[8..0] for later use. Also clock the current
-- analog input ad[7..0] into nad[7..0] to set it up for the next cycle.
nad[7..0].clk = gclk;
nnad[8..0].clk = gclk;
nad[7..0] = ad[7..0];
nnad[8..0] = (0,nad[7..0])+(0,ad[7..0]);

SECTION 9.

-- Data bus I/O functions, read produces status flags, write can set modes.
d[7..0] = tri[7..0].out;
tri_d[7..0].oe  = r02bc # fifo_r;
tri_d[7..0].in  = (hf & r02bc # f7 & fifo_r,
     f6 & fifo_r,
   eorf & r02bc # f5 & fifo_r,
   pafe & r02bc # f4 & fifo_r,
     f3 & fifo_r,
     f2 & fifo_r,
     f1 & fifo_r,
     f0 & fifo_r);

SECTION 10.

-- Watch ad7, ad6, and ad5: if any one is non-zero, set al0, the above
-- level 0 flag. Also compare ad[7..0] with LI-1 (79), and if it is greater
-- then set al1, the above level 1 flag. These flags are based on the raw
-- ADC data, and are used to synchronize the counter cnt[11..0] as well as
-- the gatea and gateb signals, which are fed back to the ADC for automatic
-- gain and level control.
al0.clk = gclk;
al1.clk = gclk;
al0 =ad7 # ad6 # ad5;
al1 = ad[7..0] > L1-1;
-- al2 = nnad[8..1] > L1-1;

SECTION 11.

-- Every time we compute a sum, we then range compare the result of that
-- sum (as an average; we drop the low bit) to determine which of 5 levels
-- it represents. The signal ala3 indicates that we are below L2, which
- would correspond to the encoder being in state 3 (or lower). Signal ala4
-- indicates that the encoder state was 4, ala5, ala6, and ala7 mean states
-- 5, 6, and 7 in the data stream. alb[7..3] is set to what ala[7..3] was
-- last clock, and alc[7..3) was two clocks ago, and ald[7..3] was three
-- ago in time.
ala[7..3].clk = gclk;
alb[7..3].clk = gclk;
alc[7..3].clk = gclk;
ald[7..3].clk = gclk;
ald[7..3] = alc[7..3];
alc[7..3] = alb[7..3];
alb[7..3] = ala[7..3];
ala3 = (nnad[8..1] < L2);
ala4 = (nnad[8..1] >= L2-1) & (nnad[8..1]< L3);
ala5 = (nnad[8..1] >= L3-1) & (nnad[8..1]< L4);

-continued ala6 = (nnad[8..1] >= L4-1) & (nnad[8..1]< L5);
ala7 = (nnad[8..1] >= L5-1) & (nnad[8..1]< L6);
-- rbit[2..0].clk = gclk;
-- lbit[2..0].clk = gclk;
-- fbit[2..0].clk = gclk;

SECTION 12.

-- If the current, last, 2nd last, and 3rd last levels all agree, we decode
-- this into a bit pattern, where al[a..d]3 means 0 (000 binary), al[a..d]4
-- - means 1 (001 binary), al[a..d]5 means 2 (010 binary), al[a..d]6 means 3
-- - (011 binary) and al[a..d]7 means 4 (100 binary) into the input pattern
-- in[2..0]. If we don't have four in a row the same, we keep the input
-- pattern from changing. Also, when we do change, ind[2..0] will have the
-- previous pattern for 1 clock.
if ala7 & alb7 & alc7 & ald7 then
  in[2..0] = 4;
elsif ala6 & alb6 & alc6 & ald6 then
  in[2..0] = 3;
elsif ala5 & alb5 & alc5 & ald5 then
  in[2..0] = 2;
elsif ala4 & alb4 & alc4 & ald4 then
  in[2..0] = 1;
elsif ala3 & alb3 & alc3 & ald3 then
  in[2..0] = 0;
else
  in[2..9] = in[2..0];
end if;
in[2..0].clk = gclk;
ind[2..0].clk = gclk;
ind[2..0] = in[2..0];

SECTION 13.

-- The following section implements the decoder
res[1..0].clk = gclk;
res0 = in0 & res0 & res1 #
       in0 & !in1 & res1 #
       in0 & !in1 & res0 #
       !in0 & in1 & !res1 #
       in2;
res1 = in1 & res1 #
       in0 & in1 #
       in2;
strobe.clk = gclk;
strobe1.clk = gclk;
strobe = (!ind0 & !in0 & in1 & !in2 & res0 & !res1) $
         ((ind0 & in0 & !in1 & !in2 & !res1    ) #
         (!ind0 & !in0 & !in1 & !in2 & !res0 & !res1) #
         (ind0 & in0 & in1 & !in2 & res1    )#
         (!ind0 & !in0 & in1 & !in2 & !res0 & res1) #
         (ind2 & in2 & res0 & res1));
strobe1 = strobe;

SECTION 14.

-- The blnk signal is set when both al0 is false and cnt[11..0]>1023, which
-- means that at least 40.675us (1024 clocks at 25.175Mhz) has passed since
-- the last time it was reset. As this becomes set, cnt[11..0] is reset to
-- 0 and begins to count upward again. With blnk now true, we wait until
-- cnt[11..0] reaches 240, or 9.533us, and then we reset blnk and set the
-- counter cnt[11..0] back to 0. We then again wait until we've counted to
-- at least 1024, and when we see al0 go false, we start over.
cnt[11..0].clk = gclk;
blnk.clk = gclk;
if blnk then                           -- if we're in blanking.
  if cnt[11..0]==240 then              -- if we count 240 clocks (9.53us) then
    blnk.k = VCC;                      -- leave blanking and reset count
    cnt[11..0]= 0;
  else                                 -- otherwise we didn't reach 9.53us, so
blank
  end if;                              -- otherwise we're not in blanking, so
else
  if !al0 & (cnt10 # cnt11) then       -- if it looks like sync, and at least
passed . . .
    blnk.j = VCC;                      -- enter blanking and reset count
    cnt[11..0]= 0;
  else
    cnt[11..0] = cnt[11..0] + 1;       -- otherwise keep waiting, for a while -continued

```
end if;
end if;
```

SECTION 15.

```
-- When cnt[11..0] reaches 4 and blnk is true, we set gatea true. It remains
-- this way until cnt[11..0] reaches 56, and we set gatea false. Note that
-- we reset both in and out of blanking, though the second reset is
-- unnecessary, it reduces the logic. So gatea will be true for 52 counts
-- (2.066us) starting 4 counts (159ns) after we reach the sync level (when
-- a10 is false).
gatea.clk = gclk;
gateb.clk = gclk;
blank
    gatea.j = VCC;                    -- enable gate-a for TDA8708
elsif cnt[11..0]==56 then             -- else if we get to 56 counts (2.22us)
    gatea.k = VCC;                    -- disable gate-a (on 52 counts, 2.06us)
end if;
```

SECTION 16.

```
-- Similarly, when cnt[11..0] reaches 176 and a10 is true and all is false
-- (we are at blanking level), we set gateb true. When cnt[11..0] reaches 228
-- or when a10 goes false, we set gateb false. This will produce a 52 count
-- (2.066us) signal starting 176 counts (6.991us) after we reach the sync
-- level (when a10 is false) or will truncate it in the case that we return
sync).
<blank
    gateb.j = VCC;                    -- enable gate-b for TDA8708
elsif cnt[11..0]==228 # !a10 then     -- else if we get to 228 counts (9.06us)
    gateb.k = VCC;                    -- disable gate-b (on 52 counts, 2.06us)
end if;
END;
```

Referring first to SECTION 8, on a sample by sample basis (i.e., a 25.175 Mhz sampling rate), the sum of the current analog input ad[7..0] and the previous analog input nad[7..0] is computed and put into nnad[8..0] for later use. The current analog input ad[7..0] is clocked into nad[7..0] to set it up for the next cycle.

At SECTION 10 ad7, ad6, and ad5 (the three highest bits of the analog input) are watched. If any one is non-zero, set a10, the above level 0 (L0) flag. The current analog input ad[7..0] is compared with L1-1 (79), and if it is greater then set a11, the above level 1 (L1) flag. These flags are based on the raw ADC data, and are used to synchronize the counter cnt[11..0] as well as the gatea and gateb signals, which are fed back to the ADC for automatic gain and level control.

With reference to SECTION 14, the blnk signal is set when both a10 is false (i.e., NOT above L0) and cnt[11..0] >1023, which means that at least 40.675 us (1024 clocks at 25.175 Mhz) has passed since the last time it was reset. As the blnk signal is set, cnt[ 11..0] is reset to 0 and begins to count upward again. With blnk now true, the system waits until cnt[11..0] reaches 240, or 9.533 us, and then blnk is reset and counter cnt[1..0] is set back to The system then waits again until counter cnt[11..0] has counted to at least 1024, and when a10 goes false, the blnk signal is set again.

Turning now to SECTION 15, when cnt[11..0] reaches 4 and blnk is true, gatea is set true. It remains this way until cnt[11..0] reaches 56, and then gatea is set false. Note that reset occurs both in and out of blanking. While the second reset is unnecessary, it reduces the logic. gatea is true for 52 counts (2.066 us) starting 4 counts (159 ns) after we reach the sync level (i.e., when a10 is false).

Similarly, in SECTION 16, when cnt[11..0] reaches 176 and a10 is true (not at sync level) and a11 is false (at blanking level), we set gateb true. When cnt[11..0] reaches 228 or when a10 goes false (at sync level), we set gateb false. This will produce a 52 count (2.066 us) signal starting 176 counts (6.991 us) after we reach the sync level (i.e., when a10 is false) or will truncate it in the case that we return to sync level (such as during the equalization pulses in the vertical sync).

Referring now to SECTION 11, every time the sum of the previous analog input (nad[7..0]) and the current analog input (ad[7..0]) is computed, the result of that sum is averaged (i.e., by dropping the low bit of the sum), and the average is range compared to determine which of 5 levels (L2, L3, L4, L5, and L6) it represents. The signal ala3 indicates that we are below L2, which would correspond to the encoder being in state 3 (or lower). Signal ala4 indicates that the encoder state was 4, while ala5, ala6, and ala7 mean states 5, 6, and 7 in the data stream. alb[7..3] is set to what ala[7..3] was last clock, and alc[7..3] was two clocks ago, and ald[7..3] was three ago in time. As a result, a history of levels (or encoder states) is generated.

Turning now to SECTION 12, if the current, last, 2nd last, and 3rd last levels (i.e., encoder states) all agree, the data is decoded into a bit pattern, where al[a..d]3 means 0 (000 binary), al[a..d]4 means 1 (001 binary), al[a..d]5 means 2 (010 binary), al[a..d]6 means 3 (011 binary) and al[a..d]7 means 4 (100 binary) into the input pattern in[2..0]. If four consecutive levels (i.e. encoder states) are not the same, the input pattern is prevented from changing. Also, when there is a change in the input pattern, ind[2..0] will have the previous pattern for 1 clock cycle.

SECTION 13 implements the decoder, which is best understood by reference to TABLE 3, set forth in FIG. 18. The labels *res0 and *res1 indicate what the "next" values should be. When the signal strobe is shown as "0" in the above table, a strobe is generated. As can be seen, there is no strobe when the input pattern in[2..0] and the delayed pattern ind[2..0] are the same (indicated with [no]). The signal strobe1 is the same as strobe, 1 clock delayed. It should be appreciated that if the previous pattern in ind[2..0] is looked up using the current output res[1..0] and the current pattern in[2..0], the next output *res[1..0] is obtained (which is the decoded data).

Referring now to SECTION 5, when strobe1 goes low, symto[3..0] counter is set to 14. On each successive clock, it counts down 1 count, toward 0.

With regard to SECTION 2 and SECTION 4, when symto[3..0] gets down to 12, the state machine clocks the current res1/res0 pair into the appropriate output pair based on the current state of the machine (sw/sw, sw/sw, sw/sw, sw/sw), and then trips to the next state. If, within states 3, 4, or 5, symto[3..0] gets down to 0 (timeout), the state machine is reset to state 2. Once state 6 has been reached, we have a valid byte ready to write to the FIFO, so on the next tick the fifo_w line is signaled, and the state machine is reset to state 2. It should be appreciated that when symto[3..0] gets down to 12 and the encoder state remains the same (i.e., the same input level), then good data has been obtained.

SECTION 6 provides address decodes for fifo_r, r02bc and w02bc, to give access to this device within the PC address space.

SECTION 9 is directed to data bus I/O functions where read produces status flags, and write can set modes.

SECTION 3 and SECTION 7 are directed to a raw mode, which is unimportant to normal operation.

SECTION 1 is directed to definitions, defaults, variables, global clock and reset signals.

Figure 19:
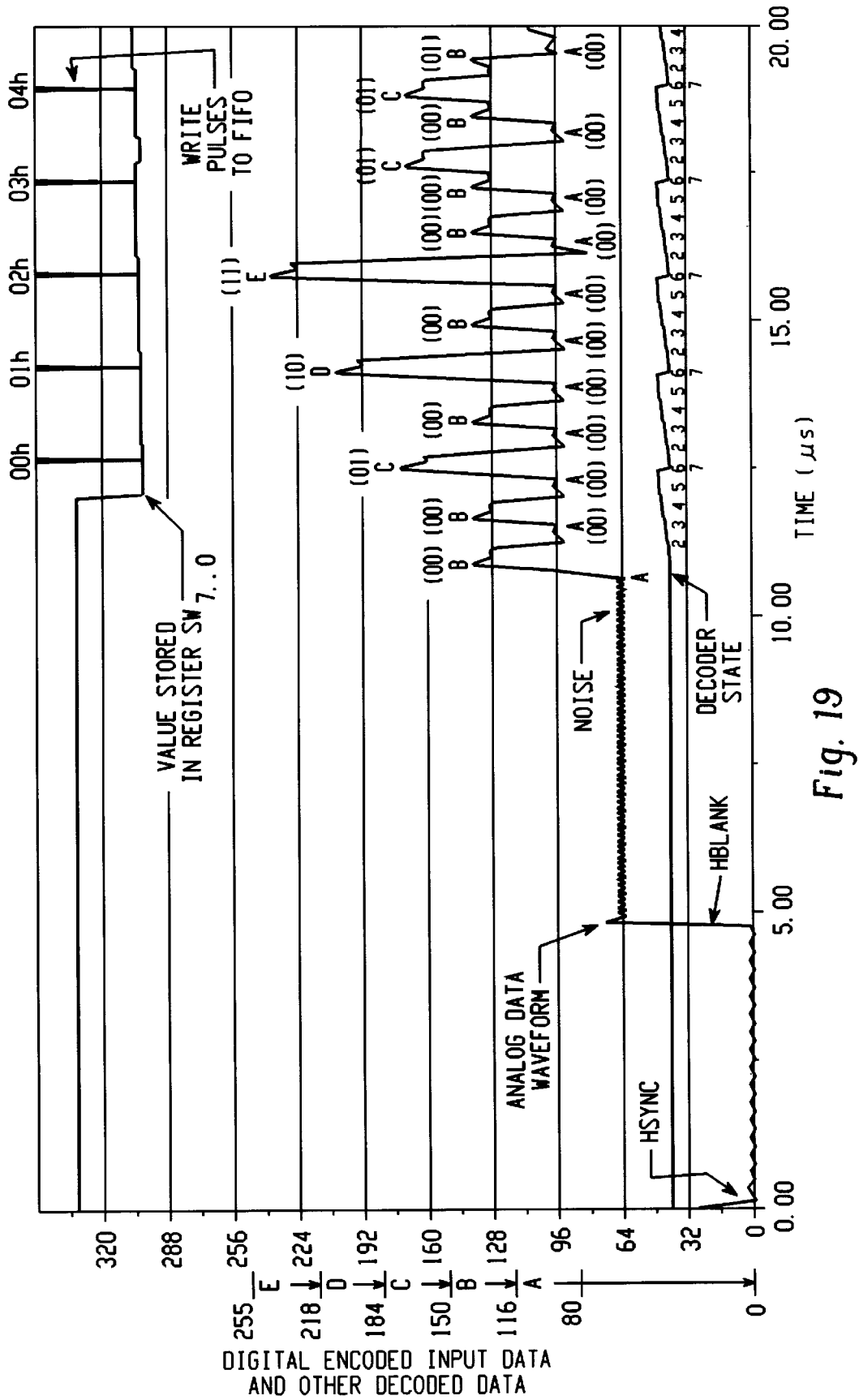
FIG. 19 is a timing diagram showing the outputs of the decoder.

Referring now to FIG. 19 there is shown a timing diagram showing the digital encoded input data (in analog form) and other decoder data, as will be described below. The analog data waveform is the waveform input to the analog-to-digital converter of the receiver/decoder. The analog data waveform shown in FIG. 19 includes the HSYNC (horizontal sync) and HBLANK (horizontal blanking) transitions, followed by noise. The transition from level A to level B marks the beginning of the encoded bit pairs. The level A to level B transition decodes to bit pair "00." The transition from level B to level A decodes to bit pair "00," and so on. As noted above in connection with the encoding procedure, the bit pairs are received in the order of least significant bit pair to most significant bit pair. Accordingly, the first byte of decoded data in the example shown in FIG. 19 is "00 00 00 00" (00hex/0 base ten) and the second byte of decoded data in the example shown in FIG. 19 is "00 00 00 01" (01hex/1 base ten). The subsequent bytes of data are 03hex and 04hex.

The corresponding decoder states are shown below the analog data waveform. State 2 is waiting for the first pair of data bits; transition from state 2 to 3 is clocking-in of the first pair of data bits to 8-bit temporary storage register SW (explained in detail below); state 3 is waiting for the second pair of data bits; transition from state 3 to state 4 is the clocking-in of the second pair of data bits to register SW; state 4 is waiting for the third pair of data bits; transition from state 4 to state 5 is the clocking-in of the third pair of data bits to register SW; state 5 is waiting for the fourth pair of data bits; and transition from state 5 to state 6 is the clocking-in of the fourth pair of data bits to register SW (thus completing a byte of data). Transition from state 6 to state 7 is a write pulse enable where the data stored in register SW is written to the FIFO. Transition from state 7 to state 2 is a write pulse disable.

FIG. 19 also shows the value stored in 8-bit register SW, which temporarily stores the decoded data bit pairs before they are written to the FIFO as a byte of data. The 8-bit register SW stores the bit pairs in their proper order as they are decoded. In this regard, the first decoded bit pair of a byte is stored as the least significant bit pair, while the last decoded bit pair of a byte is stored as the most significant bit pair. Once a full byte has been decoded and stored in register SW, the contents of register SW are written to the FIFO. Thereafter, new decoded bit pairs are written to register SW. However, it should be understood that the contents of register SW are not cleared, but rather, the new decoded data bit pairs will overwrite the old data bit pairs. Therefore, the value stored in register SW will not reflect the proper decoded data byte until all four bit pairs have been clocked-in to register SW. The hex values above the write pulses (FIG. 10) indicate the value stored in register SW at the time the data is written to the FIFO.

It should be appreciated from FIG. 19, that the decoder interprets any level below 116 as level A. In this regard, the decoder, according to a preferred embodiment does not generate decoded data during horizontal (and vertical) blanking intervals. The decoder only uses the horizontal synchronizing pulse and horizontal blanking pulse for calibrating the analog-to-digital converter (i.e., DC restoration). These and the other timing signal pulses are generated by the encoder to provide a "mock" NTSC-compatible signal. Therefore, it should be appreciated that the present invention can be modified to "skip" selected horizontal synchronizing and blanking pulses, and instead transmit (during the horizontal blanking interval) encoded data (i.e., encoded bit pairs). For example, if the horizontal synchronizing and blanking pulse are skipped every other scan line, then an additional 11 μsec of time becomes available on each scan line to transmit encoded data. This provides an increased data transfer rate of approximately 400,000 bps (with 5 encoding levels). Moreover, the present invention can be modified to transmit encoded data (i.e. encoded bit pairs) during the period dedicated to the vertical blanking interval. Substituting encoded data for the equalization, vertical sync and vertical blanking pulses, will yield an additional 21 lines of data, 60 times a second. This allows for 1260 lines×34 bytes per line, or 41580 more bytes per second. Accordingly, a 332,640 bps increase is possible when using just 5 encoding levels. In addition, by starting to encode data earlier in the horizontal blanking interval period (at least 2 us of blanking is needed for the AGC) may net as high as a 20 more bits per scan line. This allows for a 315,000 bps increase maximum for a 5 level encoding scheme. It should be understood that the present invention is suitable for the foregoing modifications because it does not rely upon the timing signals of the horizontal and vertical blanking intervals for synchronization. Instead, the encoding scheme of the present invention has an inherent self-synchronizing characteristic, as discussed in detail above.

It should also be appreciated that the present invention allows for the transmission of video data encoded at approximately 1 million bits per second across the system at 4 million bits per second. Accordingly, video data can be sent "faster than real time." For instance, 2 hours of video data can be sent from point A to point B in ½ hour. By using a broadcasting medium, 2 hours of video data can be sent broadcast to points B1 through BN in a total of ½ hour. Moreover, it is contemplated that the present invention can be optimized to provide a data transfer rate in excess of 30 million bps, while complying with the NTSC standard.

As can be appreciated from the foregoing description the present invention dramatically shortens the time needed to transmit electronic data, including databases, digital video and digitized images. As indicated above, the data may be transmitted via wired or wireless transmission mediums. Since the encoding scheme of the present invention forms an integral part of the transmission medium itself, the transmission time is substantially reduced, just as if the data had first been farther compressed before transmission. It should be appreciated that the present invention may be implemented using a unidirectional transmission mode, or a bi-directional transmission mode with symmetrical or non-symmetrical data rates in the return path. Moreover, the return path may be via many means and is not limited to the same means as the initial transmission.

It should be appreciated that the present invention has myriad applications, including downloading of on-demand movies, Internet data transfer, tele-medicine (i.e., transfer of high-resolution medical images), and the like. Any application requiring the transfer of large quantities of data in a short period of time would be particularly well suited for use in connection with the present invention.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A data transmission system for transmitting data via a television signal, the system comprising:

transmitting means adapted for transmitting the television signal, comprising:

(a) encoding means adapted for receiving raw data and generating digital encoded data indicative of the raw data, wherein said encoding means includes:
      means for establishing at least N+1 output levels, each transition in said output level representing an encoded input value indicative of raw data; and
      means for receiving a plurality of input values to be encoded, wherein said input values may be one of N different values, and
      means for transitioning from one of said at least N+1 output levels to another of said at least N+1 output levels for each successively received input value, wherein each and every successive output level is different, regardless of the successively received input value, said transitioning output levels forming the digital encoded data; and
   (b) first conversion means adapted for converting the digital encoded data to analog encoded data, said analog encoded data forming a portion of the television signal; and receiving means adapted for receiving the television signal, comprising:
   (a) second conversion means adapted for converting the analog encoded data to digital encoded data, and
   (b) decoding means adapted for converting the digital encoded data to raw data.

2. A data transmission system according to claim 1, wherein said encoding means generates digital encoded timing data indicative of timing signal data and said first conversion means converts the digital encoded timing data to analog encoded timing data, wherein said analog encoded timing data forms a timing signal portion of the television signal; and said second conversion means converts the analog encoded timing data to digital encoded timing data, and said decoding means converts the digital encoded timing data to timing signal data.

3. A data transmission system according to claim 1, wherein said transmitting means further comprises first storage means for storing raw data.

4. A data transmission system according to claim 1, wherein said receiving means further comprises second storage means for storing raw data.

5. A data transmission system according to claim 1, wherein said digital encoded data is transferred between said transmitting means and said receiving means using a television signal communications medium.

6. A data transmission system according to claim 1, wherein each said different input value represents $\log_2(N)$ bits.

7. A data transmission system according to claim 1, wherein each said N different input value represent one of the values 0 through N in base N+1.

8. A data transmission system according to claim 1, wherein said decoding means includes means for decoding each of said output levels into an input value according to a set of rules determined by both the output level currently being decoded and one or more output levels previously decoded.

9. A data transmission system according to claim 1, wherein said decoding means includes:
   means for establishing a plurality of input data ranges, each said input data range associated with an input pattern corresponding to the raw data; and
   means for comparing said digital encoded data to said plurality of input data ranges.

10. A data transmission system according to claim 1, wherein said television signal is compatible with at least one of the following television waveform standards: NTSC, SECAM, PAL and HDTV.

11. A data transmission system according to claim 1, wherein the frequency of transitions between output levels varies in accordance with the relative difference between successive output levels.

12. A data transmission system according to claim 5, wherein said television signal communications medium includes at least one of: over-the-air broadcast transmission, cable television transmission, satellite television transmission, microwave television transmission and closed-circuit television transmission.

13. A data transmission system according to claim 9, wherein said decoding means further includes means for averaging one or more successive items of said digital encoded data, and means for comparing the averaged digital encoded data to said plurality of input data ranges.

14. A data transmission system according to claim 2, wherein said encoding means includes:
   means for establishing at least N+1 output levels, each transition in said output level representing an encoded input value indicative of timing signal data; and
   means for receiving a plurality of input values to be encoded, wherein said input values may be one of N different values.

15. A data transmission system according to claim 2, wherein said timing signal data includes timing data associated with a horizontal blanking interval and a vertical blanking interval.

16. A data transmission system according to claim 11, wherein said transmitting means further comprises:
   means for transitioning from one of said at least N+1 output levels to another of said at least N+1 output levels for each successively received input value, said output levels forming the digital encoded timing data.

17. A data transmission system according to claim 16, wherein said decoding means includes means for decoding each of said output levels into an input value according to a set of rules determined by both the output level currently being decoded and one or more output levels previously decoded.

18. A method for communicating data via a television signal, the method comprising:
    encoding raw data values to form digital encoded data indicative of the raw data values, said step of encoding includes;
      (a) receiving a plurality of raw data values to be encoded, wherein each said raw data value may be one of N different raw data values, and
      (b) establishing at least N+1 output levels, each transition in said output level representing an encoded raw data value;
    converting the digital encoded data to analog encoded data;
    transmitting the analog encoded data in a portion of the television signal, wherein said step of transmitting includes transitioning from one of said at least N+1 output levels to another of said at least N+1 output levels for each successively received raw data value, wherein each and every successive output level is different, regardless of the successively received raw data value, said transitioning output levels forming the digital encoded data;
    receiving the analog encoded data, and converting the analog encoded data to digital encoded data; and
    decoding the digital encoded data to form the raw data values.

19. A method according to claim 18, wherein said method further includes the steps of:
    encoding timing signal data to form digital encoded timing data indicative of the timing signal data;
    converting the digital encoded timing data to analog encoded timing data, wherein said analog encoded timing data is transmitted in a timing signal portion of the television signal;
    converting the analog encoded timing data to digital encoded timing signal data; and
    decoding the digital encoded timing data to form the timing signal data.

20. A method according to claim 18, wherein the step of transmitting the analog encoded data includes transferring the analog encoded data between a transmitting means and a receiving means using a television signal communications medium.

21. A method according to claim 18, wherein each of said N different raw data values represent $\log_2(N)$ bits.

22. A method according to claim 18, wherein each said N different raw data values represent one of the values 0 through N in base N+1.

23. A method according to claim 18, wherein said step of decoding includes:
    decoding each of said output levels into an input value according to a set of rules determined by both the output level currently being decoded and one or more output levels previously decoded.

24. A method according to claim 18, wherein said step of decoding includes:
    establishing a plurality of input data ranges, each said input data range associated with an input pattern corresponding to the raw data; and
    comparing said digital encoded data to said plurality of input data ranges.

25. A method according to claim 18, wherein said television signal is compatible with at least one of the following television waveform standards: NTSC, SECAM, PAL and HDTV.

26. A method according to claim 19, wherein the frequency of transitions between output levels varies in accordance with the relative difference between successive output levels.

27. A method according to claim 20, wherein said television signal communications medium includes at least one of: over-the-air broadcast transmission, cable television transmission, microwave television transmission, closed-circuit television transmission, and satellite television transmission.

28. A method according to claim 24, wherein said step of decoding fixer includes the step of averaging one or more successive items of said digital encoded data and comparing the averaged digital encoded data to said plurality of input data ranges.

29. A method according to claim 19, wherein said timing signal data includes timing data associated with a horizontal blanking interval and a vertical blanking interval.

30. A data transmission system for transmitting data via a television signal, the system comprising:
    transmitting means adapted for encoding raw digital input data into encoded data and generating a mock NTSC television signal having the encoded data embedded therein, said transmitting means including means for transitioning from one of at least N+1 output levels to another of at least N+1 output levels for each successively received raw digital input data, wherein each and every successive output level is different, said transitioning output levels forming the encoded data; and
    receiving means adapted for receiving the mock NTSC television signal and decoding the encoded data to form the raw digital input data.

31. A data transmission system according to claim 30, wherein said transmitting means encodes raw digital input data at a rate equal to or greater than 1 million bits per second (bps).

32. A data transmission system according to claim 30, wherein said transmitting means includes a broadcast transmitter.

33. A data transmission system according to claim 30, wherein said receiving means includes a plurality of television signal receiving devices.

34. A data transmission system for transmitting data via a radio frequency (RE) signal, the system comprising:
    transmitting means adapted for transmitting the RF signal, including:
      encoding means adapted for receiving raw data values and generating digital encoded data indicative of the raw data values, wherein said encoding means includes:
        (a) means for receiving a plurality of raw data values to be encoded, wherein said raw data values may be one of N different values,
        (b) means for establishing at least N+1 output levels having a corresponding digital encoded data value, each transition in said output level representing a raw data value, and
        (c) means for transitioning from one of said at least N+1 output levels to another of said at least N+1 output levels for each successively received raw data value, wherein each and every successive output level is different, said transitioning output levels forming the digital encoded data; and analog conversion means adapted for converting the digital encoded data to analog encoded data.

35. A data transmission system according to claim 34, wherein said system further comprises:

receiving means adapted for receiving the RF signal, including:

digital conversion means adapted for converting the analog encoded data to digital encoded data; and decoding means adapted for converting the digital encoded data to raw data.

36. A data transmission system according to claim 35, wherein said RF signal is a television signal.

37. A data transmission system according to claim 36, wherein said television signal is at least one of an over-the-air broadcast television signal, a cable television signal, a microwave television signal, a closed-circuit television signal and a satellite television signal.

38. A data transmission system according to claim 36, wherein said television signal includes an active video portion for displaying video information, wherein said analog encoded data forms a part of the active video portion.

39. A data transmission system according to claim 36, wherein said television signal includes a timing signal portion for providing receiver timing signals, wherein said analog encoded data forms a part of the timing signal portion.

40. A data transmission system according to claim 36, wherein said television signal is compatible with at least one of the following television waveform standards: NTSC, SECAM PAL, and HDTV.

41. A method for transmitting data via a radio frequency (RF) signal, the method comprising:

receiving a plurality of raw data values to be encoded into digital encoded data values, wherein said raw data values may be one of N different values;

establishing at least N+1 output levels having a corresponding digital encoded data value, each transition in said output level representing a raw data value; and converting the digital encoded data to analog encoded data forming at least a portion of a transmitted RF signal, wherein said analog encoded data includes data transitioning from one of said at least N+1 output levels to another of said at least N+1 output levels for each successively received raw data value, wherein each and every successive output level is different.

42. A method according to claim 41, wherein said method further comprises:

receiving the transmitted RF signal;

converting said analog encoded data to digital encoded data values; and converting the digital encoded data values to raw data.

43. A method according to claim 41, wherein said RF signal is a television signal.

44. A data transmission system for transmitting data via a television signal, the system comprising:

a transmitter adapted for transmitting the television signal, comprising:

(a) an encoder adapted for receiving raw data value and generating digital encoded data indicative of the raw data, said encoder generating digital encoded data transitioning from one of at least N+1 output levels to another of said at least N+1 output levels for each successively received raw data value, wherein each and every successive output level is different, and (b) a first converter adapted for converting the digital encoded data to analog encoded data, said analog encoded data forming a portion of the television signal; and a receiver adapted for receiving the television signal, comprising:

(a) a second converter adapted for converting the analog encoded data to digital encoded data, and (b) a decoder adapted for converting the digital encoded data to raw data.

45. A data transmission system for transmitting data via a radio frequency (RF) signal, the system comprising:

a transmitter adapted for transmitting the RF signal, including:

an encoder adapted for receiving raw data values and generating digital encoded data indicative of the raw data values, wherein said encoder includes:

(a) means for receiving a plurality of raw data values to be encoded, wherein said raw data values may be one of N different values, (b) means for establishing at least N+1 output levels corresponding to digital encoded data, each transition in said output level representing a raw data value, and (c) means for transitioning from one of said at least N+1 output levels to another of said at least N+1 output levels for each successively received raw data value, wherein each and every successive output level is different, said transitioning output levels forming the digital encoded data; and a digital-to-analog converter for converting the digital encoded data to analog encoded data.

46. A data communication system for communicating data via a television signal, the data communication system comprising:

input means for receiving a plurality of input data values representative of raw data, each said input data value having one of N different values; and encoding means for generating digital encoded data representative of said input data values, said encoding means transitioning from one of at least N+1 output levels to another of said at least N+1 output levels in respective correspondence with each successively received input data value, wherein each and every successive output level is different, regardless of the successively received input data value, said transitioning output levels forming digital encoded data; and first conversion means adapted for converting the digital encoded data to analog encoded data, said analog encoded data forming a portion of the television signal; and receiving means adapted for receiving the television signal, comprising:

second conversion means adapted for converting the analog encoded data to digital encoded data, and decoding means adapted for converting the digital encoded data to said plurality of input data values.

47. A data communication system according to claim 46, wherein said encoding means generates digital encoded timing data indicative of timing signal data, said digital encoded timing data is converted by said first conversion means to analog encoded timing data, which forms a timing signal portion of said television signal.

48. A data communication system according to claim 46, wherein said digital encoded data is transferred between said second conversion means and said decoding means via a television signal communications medium.

49. A data communication system according to claim 46, wherein the time between initiation of successive transitions between output levels varies in accordance with the relative difference between consecutive output levels.

50. A method of high-speed data communications via a television signal, the method comprising:

receiving a plurality of input data values representative of raw data, each said input data value having one of N different values;

generating digital encoded data representative of said input data values by transitioning from one of at least N+1 output levels to another of said at least N+1 output levels in respective correspondence with each successively received input data value, wherein each and every successive output level is different, regardless of the successively received input data value, said transitioning output levels forming digital encoded data; and converting the digital encoded data to analog encoded data, wherein said analog encoded data forms at least a portion of the television signal, and transmitting the television signal via a television communication medium.

51. A method of high-speed data communications according to claim 50, wherein said method further comprises the steps of:

receiving said transmitted television signal;

converting the analog encoded data to digital encoded data; and decoding said digital encoded data to said input data values.

52. A method of high-speed data communications according to claim 50, wherein said method further comprises the step of generating digital encoded timing data indicative of timing signal data, wherein said digital encoded timing signal data is converted to analog encoded timing signal data which forms a timing signal portion of said television signal.

53. A method of high-speed data communications according to claim 50, wherein the time between initiation of successive transitions between output levels varies in accordance with the relative difference between consecutive output levels.

* * * * *